(12) United States Patent
Windle

(10) Patent No.: US 6,686,970 B1
(45) Date of Patent: Feb. 3, 2004

(54) MULTI-MEDIA EDITING METHOD AND APPARATUS

(75) Inventor: John Richard Windle, Hebersham (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/165,737

(22) Filed: Oct. 5, 1998

(30) Foreign Application Priority Data

Oct. 3, 1997 (AU) .............................................. PO9601

(51) Int. Cl.[7] .............................................. H04N 5/262
(52) U.S. Cl. ........................................................ 348/584
(58) Field of Search ................................ 345/328, 620, 345/625, 629, 632, 660; 725/37, 61, 86; 386/83; 348/584, 578, 589, 586, 239; H04N 5/262, 5/265, 5/272

(56) References Cited

U.S. PATENT DOCUMENTS 5,589,945 A * 12/1996 Abecassis

FOREIGN PATENT DOCUMENTS

GB 2305051 A * 3/1997

* cited by examiner

*Primary Examiner*—David E. Harvey
(74) *Attorney, Agent, or Firm*—Fitzpatrick, Cella, Harper & Scinto

(57) ABSTRACT

A media production is formed from source media including at least one of audio media and visual media. The source media is received and analyzed to extract therefrom content information associated with a corresponding element of the source media. The content information is examined for at least one of the elements to determine a limited set of production rules applicable to the corresponding element. A user may selectively apply at least one of the rules to a corresponding one of the elements so as to alter the corresponding element, for example in duration, in synchronism with other elements. The altered element is then combined with at least one other of the media to form the media production.

8 Claims, 25 Drawing Sheets

MULTI-MEDIA EDITING METHOD AND APPARATUS

FIELD OF THE INVENTION

The present invention generally relates to multi-media editing and, in particular to a method of creating multi-media productions that uses content information of elements of the production to guide in a construction of the multi-media production.

BACKGROUND ART

Combining still images, text, video, sound and other multimedia elements into a production is a complex task that requires extensive knowledge in many diverse areas. Video editing is a well established field in which numerous types of elements are combined to form a final production. The types of elements often used in the construction of a video production are visual, audible and textual. Visual elements include such things as video footage, still shots and animation. Audible elements include such things as backing tracks, sound effects, commentaries and recorded audio of the video clips. Textual elements include such things as titles, credits and subtitles.

These elements have various properties that can be altered and effects that can be applied. The elements can then be combined in many different ways to form a final product and for each combination there is a large amount of knowledge that is relevant to the choices that must be made.

For many years, this extent of production was available only to TV stations and large production houses. With the advent of home video cameras, personal computers, inexpensive video capture cards and video editing software, it is now possible for many more people to create their own video productions.

However, the knowledge needed to make good choices must be learned by the person creating the production. For many people who only wish to put together a few simple productions the learning curve is quite steep and poor quality productions are created due to a lack of informed decisions. Similar difficulties arise in the case where it is desired to create a production made up of digitised stills and music, stills and text, video material alone, or sound material alone.

Thus there exists a need for an apparatus, system and/or method for a guided creation of a production which provides assistance and guidance to a user creating such a production.

SUMMARY OF THE INVENTION

In accordance with one general aspect of the present invention there is provided a computer implemented method of creating a dynamic production for sensory perception by a user, said production including at least one of an audio element and a visual element able to be perceived by the user, said method including the steps of:

(a) extracting from at least one portion of at least one said element content information relating to a perceivable content of said portion; and (b) creating said production by applying at least one of a predetermined (first) set of production rules to said portion according to the extracted content information.

Preferably, the method includes the further steps, before step (a), of:

(aa) applying to said at least one portion at least one of a predetermined (second) set of production rules to form said content information corresponding thereto; and (ab) associating said content information with the corresponding said portion.

In accordance with another general aspect of the present invention there is provided a computerised method of forming a dynamic media production from source media having elements including at least one of audio media and visual media, said method including the steps of:

(a) receiving said source media;

(b) analysing at least one said element for at least a portion of said source media with a predetermined set of content rules to extract therefrom content information associated with a corresponding portion of said source media;

(c) examining the content information of at least one said portion to determine a limited set of production rules applicable to the corresponding said element;

(d) selectively applying at least one of said production rules to a corresponding one of said elements so as to alter said corresponding one element; and (e) combining at least said altered element with other of said media to form said media production.

Other aspects of the invention including apparatus, sytems and computer program products will become apparent from an understanding of the following description and of the claims appended hereto.

BRIEF DESCRIPTION OF THE DRAWINGS

Notwithstanding any other forms which may fall within the scope of the present invention, preferred forms of the invention will now be described, by way of example only, with reference to the accompanying drawings, in which.

DETAILED DESCRIPTION

Figure 1:
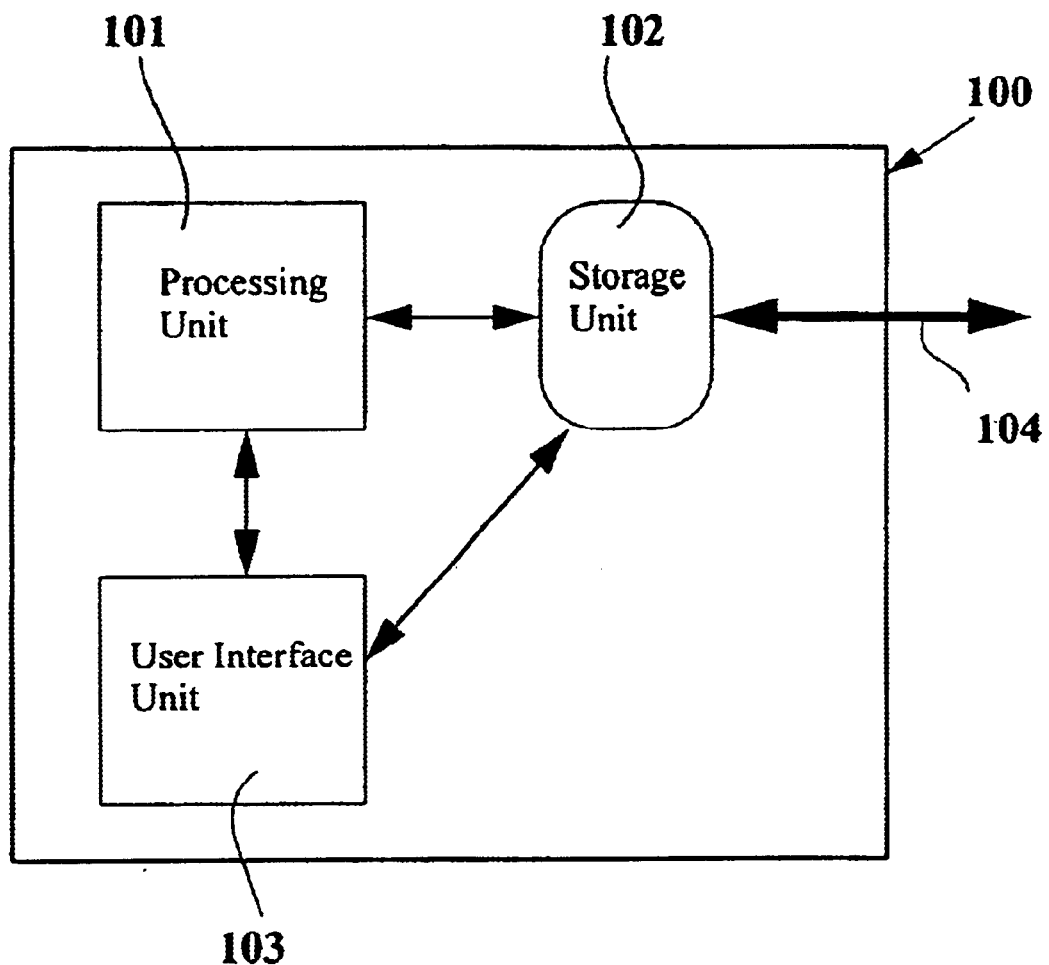
FIG. 1 is a schematic representation of an overview of an apparatus in accordance with a preferred embodiment of the present invention.

FIG. 1 is a block diagram of an overview of a preferred embodiment of a Multimedia Editing device 100. The Multimedia Editing device 100 includes a processing unit 101, a storage unit 102, a user interface unit 103, and communications port and corresponding bus 104. The storage unit 102 stores application software code used by the processor unit 101 to control and respond to the user interface unit 103. The storage unit 102 is also used to store various rules used in the creation of a production and one or more elements that are to be used in the production. The term production is used here in the generic sense, because a production could be a video production, a musical production, a series of still photographs presented as a slide show or a combination of these. Elements, as described previously, include visual elements, audio elements and/or textual elements which can be described, quite generally, as components of a production. The visual elements may include video footage, video clips, that is, a portion of a video footage; a single video frame, an entire movie, computer clip-art, photographs, and created images such as those used in video animation. The audible elements may include sound recordings, sound effects, music and musical scores, single and multiple tones or notes. Textual elements can include titles and credits of a production, advertising such as logos or slogans, and/or other indicia.

In the overview of the preferred embodiment the communication port and corresponding bus 104 is used to transfer data to and from the storage unit 102, The data is typically a digital representation of the elements previously described. The communication port and corresponding bus 104 is use for other purposes as well, for instance downloading or uploading the application software code. An example of a bus 104, and corresponding interface, is that defined by the IEEE 1394 high-speed serial bus standard.

The processing unit 101, aided by the application software, performs and analysis of the elements to extract content information. The extracted context information is stored in the storage unit 102 and is associated with the corresponding element from which the content information was extracted. The content information is specific to the various different types of elements, (eg., visual, audio, textual) and as such the analysis performed by the processing unit 101, in conjunction with the software, will vary accordingly. The analysis performed on the various elements to extract, or in some cases generate, the content information will be described hereinafter under a corresponding subsection.

The analysis for extracting the content information can be done as an "off-line" process, that is, at some time after the various elements have been downloaded to the storage unit 102. However, it is envisaged that at least some, if not all, of the analysis could be done "on the fly" as the data of the various elements is downloaded 104 to the storage unit 102. In the preferred implementation, the analysis of the various elements may be performed at least in part by a recording or capture device which is used to obtain the element. For example, a digital video camera (DVC) can be modified to store or record not only image data and sound data, but also metadata such as date, time, number of video frames taken, etc. An example of a DVC for capturing selected elements which can be used by the preferred embodiment is described below as an "Enhanced Gathering Apparatus".

Figure 2:
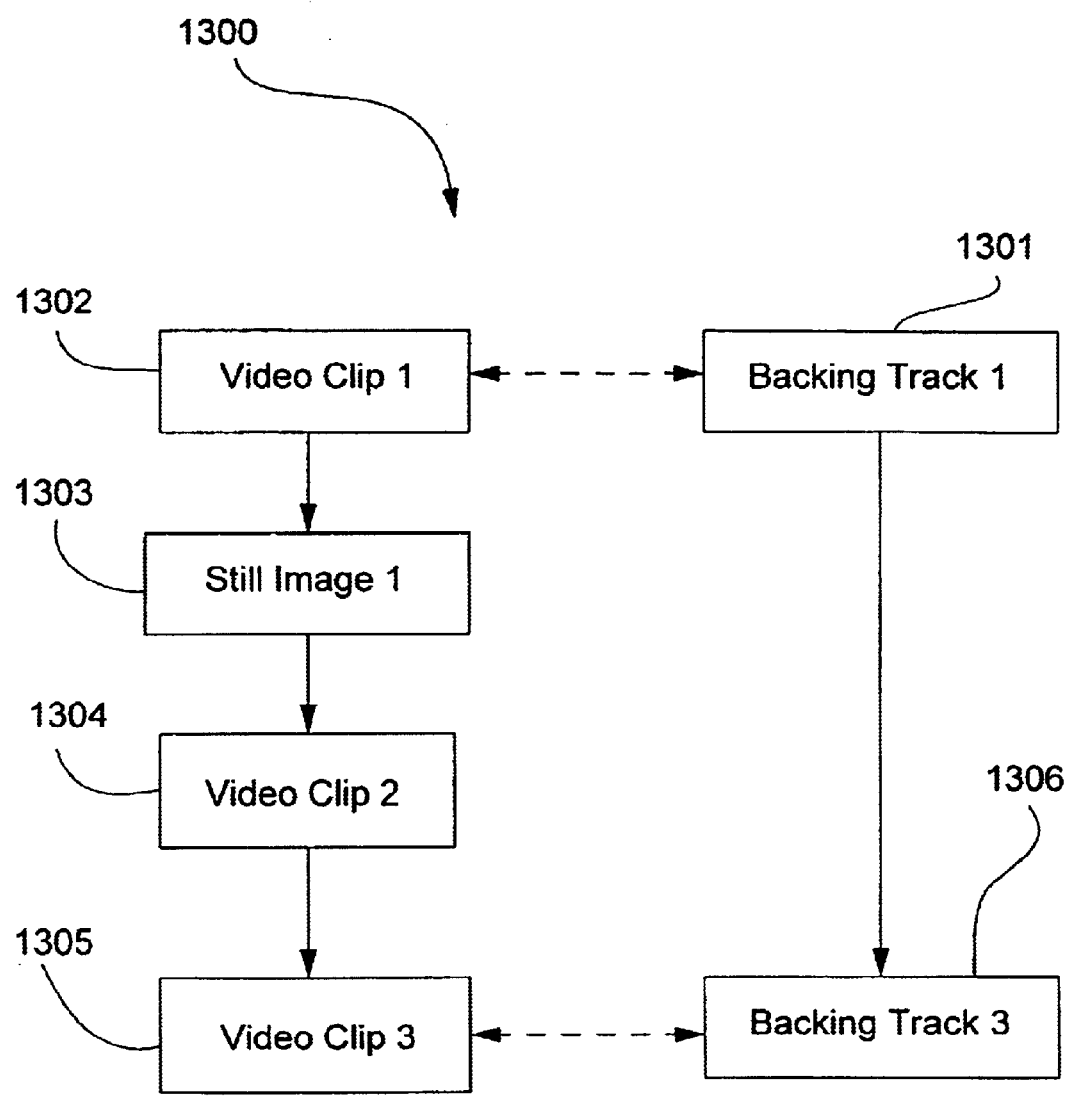
FIG. 2 is a block diagram of a sample input script of multimedia elements generated in accordance with the preferred embodiment.

Referring to FIG. 2, there is shown a block diagram representing an input script 1300 comprising a plurality of visual and audio elements for generating a production. The input script 1300 of FIG. 2 is an example of a production which is a video presentation, however input scripts for other forms of productions such as audio-productions, still frame "slide show type" presentation, productions such as printed matter, (ie. a book, catalogue etc.), are also possible. The visual elements of the script 1300 include video segments 1302, 1304 and 1305, preferably stored in digital form, and a digital still image 1303 which can be a video segment having substantially one image reproduced a number of times so as to provide the appearance, when rendered to a display, of a still image or a single frame image paused for a pre-determined duration. The audio elements comprise audio backing tracks 1301 and 1306. Typically the audio backing tracks include musical tracks and/or sound effects, and in some cases are audio tracks in addition to an audio track associated with a video segment. Throughout this description a reference to a video segment, unless specified to the contrary, is a reference to a video segment including an associated audio track, where the audio track is available. For example, video footage usually comes with a sound recording associated with the video footage, like a persons voice or background noise. This audio information is assumed to be part of a video segment for the purpose of the description of the preferred embodiment, although it will be appreciated that embodiments may be practiced using only one of visual or audio source information.

Input scripts may be rendered (reproduced) either sequentially or in parallel, as the situation dictates or as need arise. The input script 1300 is preferably rendered sequentially. However, as in most multimedia implementations, audio elements are typically rendered in parallel via different channels to the visual elements. In the arrangement of the input script 1300, a first audio backing track 1301 is commenced and outputted to an audio device concurrently with a sequential output of visual elements 1302, 1303 and 1304 to a display device. At the end of the visual element 1304, a transition occurs from audio backing track 1301 to the next sequential audio backing track 1306, and a further sequential visual element 1305 is displayed concurrently with the audio backing track 1306. A synchronicity between a commencement of the visual element and an audio backing track is desired, and preferably associated timing information is encoded with each element, whether the element is visual, audio or textual. Extraction of content information may be performed "live", for example whilst recording the visual image and/or the sound source. This may be achieved substantially automatically or semi-automatically with user input. In some instances, content information may be generated after recording takes place under manual control or through automated post-processing. Preferably each element further includes:

information that directs a processing application to a source data and content data associated with the element; and supplementary information such as duration of an element, and an offset start time relative to source data.

Figure 3:
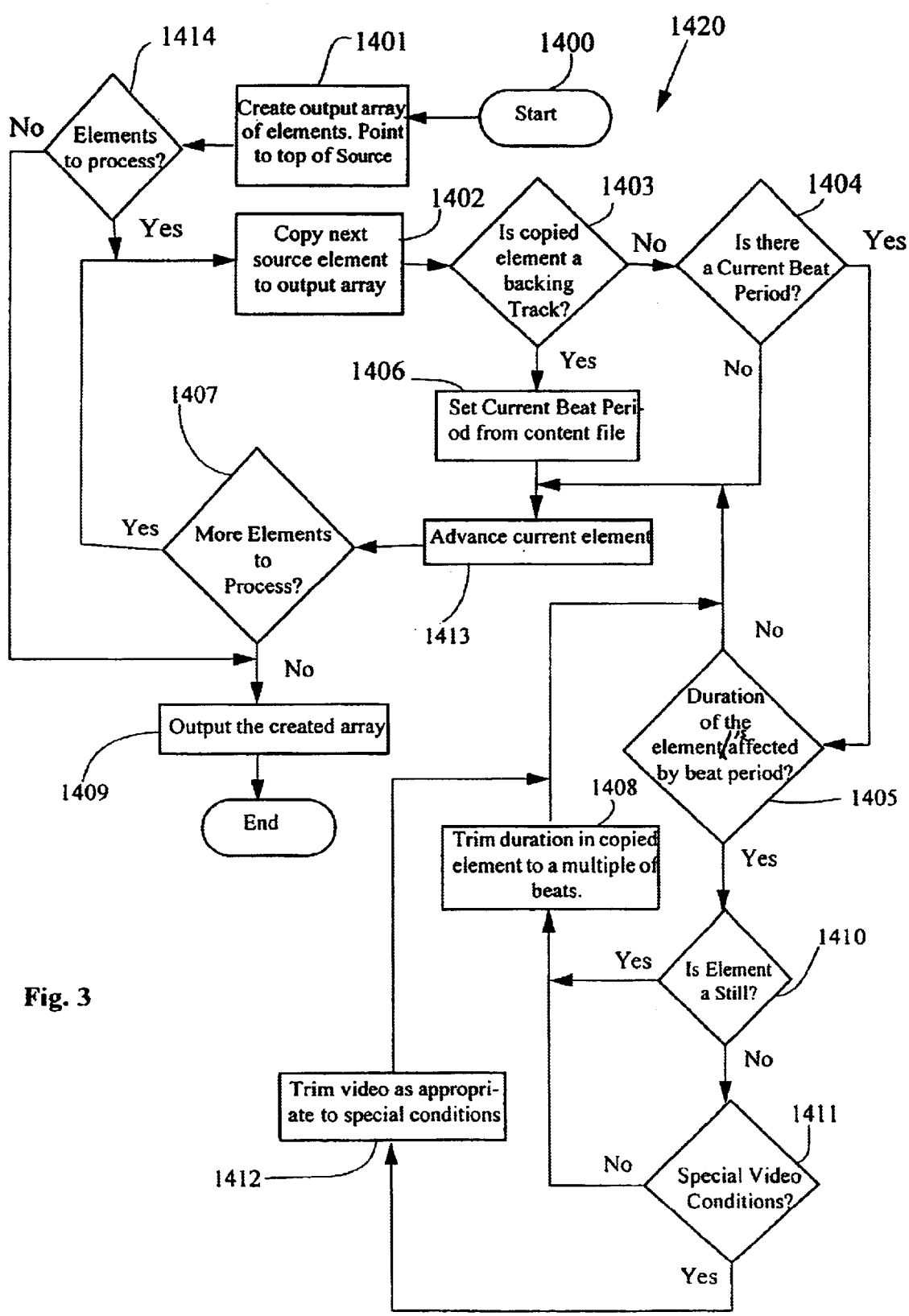
FIG. 3 is a flow chart of a beat synchronisation process in accordance with the preferred embodiment.

Referring to FIG. 3, there is shown a flow chart of a beat synchronisation process 1420 in accordance with the preferred embodiment. The beat synchronisation process 1420 receives input in the form of a plurality of elements (ie. an input array of elements) in a pre-determined sequence or order. An output of the beat synchronisation process 1420 is an input script substantially of the form of the input script 1300 of FIG. 2. However each element of the input array of elements may or may not be altered by the beat synchronisation process 1420.

Initially at step 1400 the beat synchronisation process 1420 receives as input an array of elements (visual, audio etc.) of a production, preferably in a predetermined order. Next an empty output array is created at step 1401 having a substantially similar number of available entry slots as the number of elements of the input array. In this creation step 1401, a pointer is also initialised to a starting point of a first element of the input array. Control is then passed to a next step, a decision step 1414, which decides if there are elements in the input array to be processed. If the result of the decision step 1414 is "false", then a current output array is outputted 1409 in a format represented by the input script 1300. Otherwise, if there exists at least one element, the decision step 1414 returns "true" and proceeds to a copy step 1402 where a current element of the input array (source array) is copied to a slot of the output array, The copy step 1402 is followed by a next step in the flowchart 1420, an "audio element" decision step 1403, which returns a true value if the current element is an audio backing track, otherwise the step 1403 returns a false. At a true result from the audio element decision step 1403 the process enters a read input step 1406 which reads from a supplementary information portion of the current element the beat period, and sets a current beat period accordingly. This step may include calculating the beat period. The pointer is advanced at step 1413 to a next element of the input array. At an otherwise false result from the audio element decision step 1403, an additional decision step 1404 is entered which determines whether or not a current beat frequency has been set. The additional decision step 1404 returns a true value when a current beat period has been set, and false otherwise. A false decision at step 1404 results in the pointer advancing at step 1413 to point to the next element of the input array. A true result from the additional decision step 1404 has the process 1420 enter yet a further decision step 1405 which determines whether or not the current element is affected by the current beat period. In the event that the current element is not affected by the current beat period, the pointer is advanced at step 1413 to the next element. A true result, from the decision step 1405 for determining whether or not the current element is affected by the beat period, leads to a further a decision step 1410 for deciding whether or not the current element is a "still shot" sequence. At this decision step 1410, if the current element is a still shot then a trimming step 1408 is performed on the current element, the current element being the current element of the output array, that is, the element copied at process step 1402. Following the trimming step 1408 the pointer is advanced at step 1413 to the next element.

A false return from decision step 1410 (ie. the current element is not a still shot), leads to a decision step 1411 which determines if the current element, not being a backing track or still image, includes predetermined video conditions such as a zoom shot sequence, a pan shot sequence or other predetermined video special effects. No video conditions being identified (determined) for the current element, a trimming step 1408 is performed on the current element, On each occasion that the trimming step 1408 is performed on an element (visual element). The element is trimmed to substantially a multiple of the current beat period. As previously described, following the trimming step 1408 the pointer is advanced 1413 to the next element (ie. a next input element, to be copied to the output array, if any). If a video condition is identified, at step 1411, a true is returned from the decision step 1411 and the current element is trimmed at step 1412 in accordance with predetermined rules defined for each video condition. Examples of the predetermined rules applied are described hereinafter. The process flow following the trimming step 1412 leads to the pointer advancing step 1413 previously described. Once the pointer is advanced to the next element of the input array, a decision step 1407 checks whether or not there are further elements in the input array. If so, the process is looped back to the copy step 1402 and the steps previously described subsequent to the copy step 1402 are processed until the decision step 1407, checking for further input elements returns a false, in which case the output array is outputted 1409 ending the beat synchronisation process 1420 until it is re-evoked. Although the above describes trimming the video, similar processing may be used to either stretch or compress the video so as to match the beat frequency.

Figure 4:
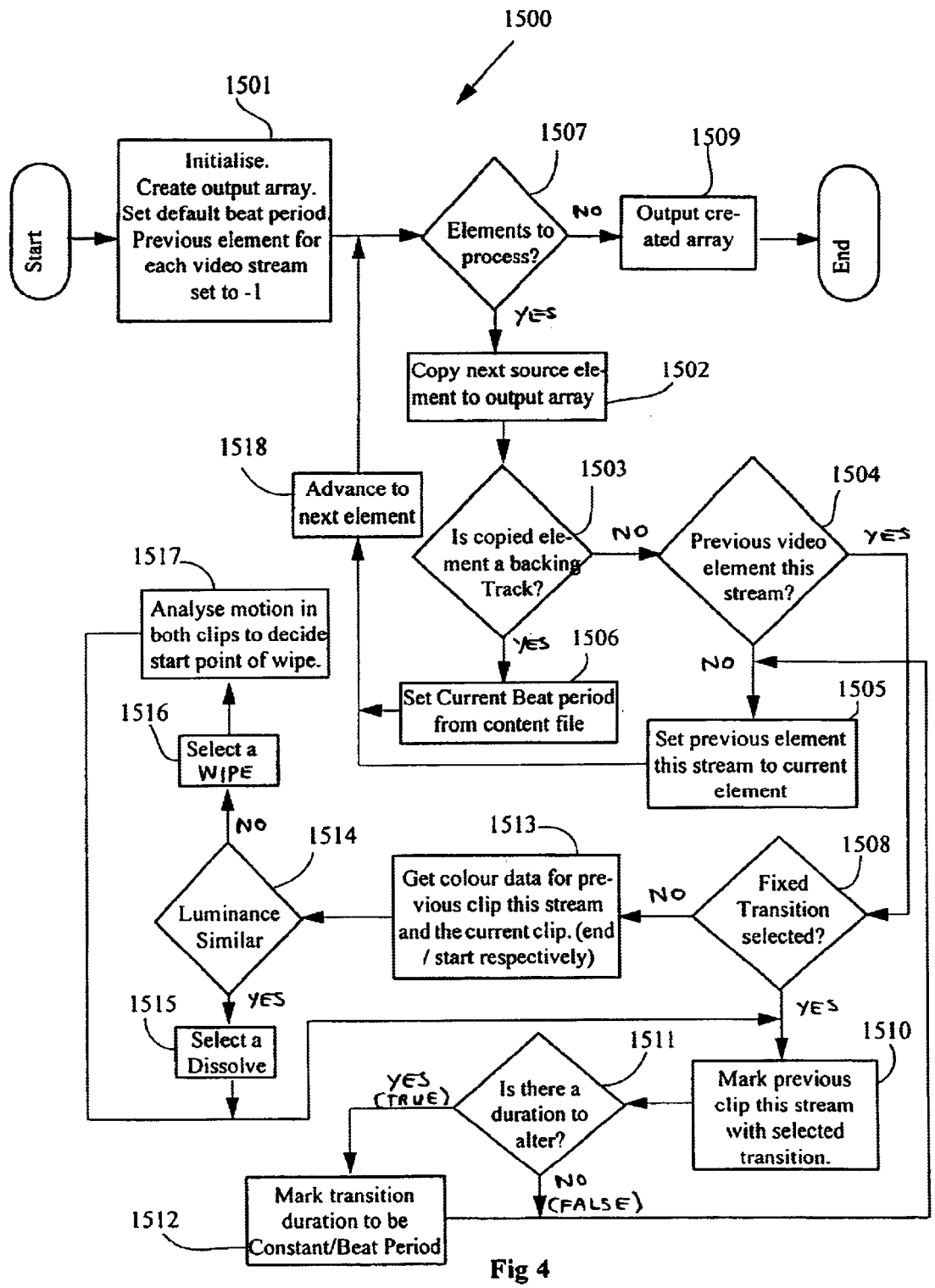
FIG. 4 is a flow chart of a transition generating process in accordance with the preferred embodiment.

Referring now to FIG. 4, there is shown a flow chart of a transition generating process 1500 in accordance with the preferred embodiment, The transition generating process 1500 determines a type of transition to be used between video elements and determines the duration of a transition. The transition is not rendered until a final production is rendered to an output display device.

Initially, the transition generating process 1500 receives an input an input array of elements. Each element in the input array includes information of a corresponding channel, or channels, to which it will be rendered. At a first step 1501 in the process 1500, an empty output array is created with substantially the same number of slots as the number of elements of the input array. At this step 1501 initialisation procedures are also performed. For example, a source pointer is set to point to a first element of the input array, a destination pointer is set to point to a first available slot of the output array, and a beat period variable is set to a default value until a new value for the beat period is determined, Further, for each video, channel, a variable (ie. "PrevEle") is supported which points to a previous video element.

Initially, since no previous video elements are available, the variable PrevEle is assigned a value indicating no previous video elements. Following initialisation, control in the process 1500 is transferred to a decision step 1507 which determines whether or not there are elements in the input array to be processed. If no elements are to be processed, the decision step 1507 returns a false and current values of the output array are outputted in a form of an input script substantially as illustrated by FIG. 2.

If the input array is an empty array then an empty input script will result (ie. no input script). However, if there are elements of the input array to be processed, decision step 1507 will return true which leads the process to a copy step 1502. At the copy step 1502 a current input (array) element is copied to an available slot of the output array. Subsequent to the copy step 1502 a decision step 1503 is entered which determines whether or not a current element (copied element) is an audio backing track. If the current element is an audio backing track, the current beat period is set to the extracted value in step 1506 and incremented in step 1518 to a next element of the input array. Otherwise, at decision step 1503, the current element is not a audio backing track and a next step 1504 is entered which determines whether or not a previous video element on the current element's video channel, for which a transition is required to the current video element, exists. If no previous video element exists on the current video channel, a set "PrevEle" step 1505 is entered, which sets the "PrevEle" variable to point to the current element and then passes to the increment step 1518. If a previous video element (ie. to the current (video) element), is available, the process flow enters a decision step 1508 which checks whether or not a fixed transition style (eg. a butt edit transition) has been selected by a user of the Multimedia Editing device 100. Where a fixed transition has been selected, a marking step 1510 is entered which marks the previous video element for transition to the current video element.

If no fixed transition is selected, the decision step 1508 passes to an extract colour data step 1513. Preferably luminance data is extracted from a tail end of a previous video element and a front end of the current video element. A next step 1514 is entered which decides on the basis of the extracted colour data whether to choose a dissolve transition, selected in step 1515, or to choose a wipe transition, selected in step 1516. In the case of a wipe transition, an additional step 1517 is used to analyse motion vectors of both a previous and the current video element to determine details of the wipe transitions. Such wipe transition details include starting point, speed of wipe etc.

Following on from the additional step 1517 of the chosen wipe transition or from step 1515 for choosing a dissolve transition, both return to the marking step 1510 previously described. At the marking step 1510 the previous video element is marked for transition to the current video element in accordance with the chosen transition (ie.

Dissolve, wipe, fixed etc.). Following the marking step 1510, a decision step 1511 is entered which determines if the chosen transition has a duration length longer than a predetermined duration length. Optionally, the decision step 1511 checks for fixed transitions either in addition to or instead of the predetermined duration length. At decision step 1511, a "true" value indicates a duration longer than the predetermined duration length, in which case step 1512 marks a duration length of the chosen transition to be a multiple of the current beat period. Otherwise, decision step 1511 returns a "false" indicating a shorter duration length than the predetermined duration length. Such a situation leads the flow chart back to the set "PrevEle" step 1505. Further, once the determining step 1512 has marked the duration length of a chosen transition, the flow is also returned to the set "PrevEle" step 1505.

Again, as previously described, the set "PrevEle" step 1505 sets the "PrevEle" variable to point to the current video element and returns to the increment to the next input element step 1518. This step 1518 increments the source pointer and continues for a next input element as hereinbefore described.

The transition generating process 1500 terminates when no further input elements are available for processing, in which case the current elements of the output array are outputted substantially in the form of the input script 1300 of FIG. 2.

Figure 5:
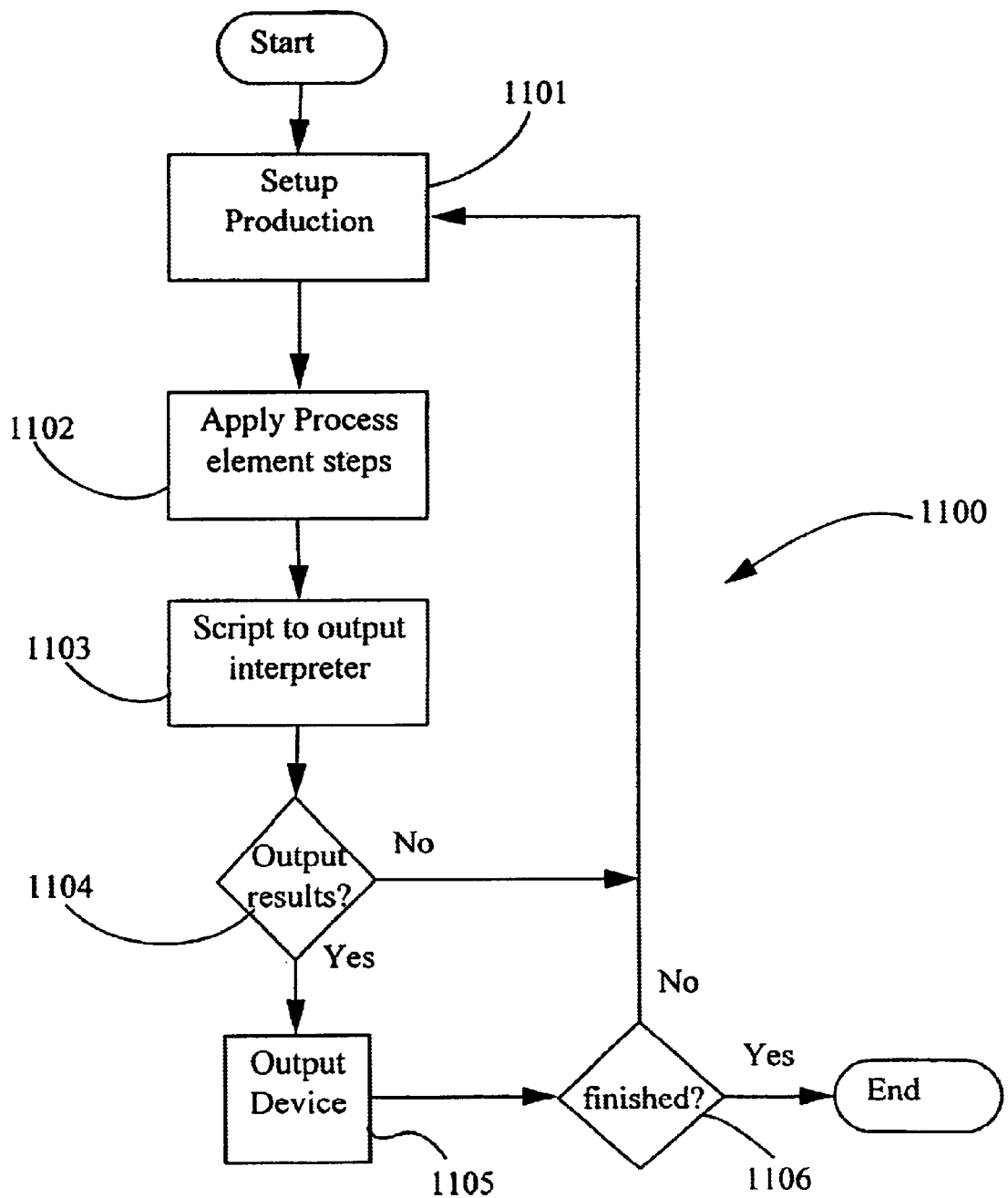
FIG. 5 is a flow chart of an overview of an editing process in accordance with the preferred embodiment.

FIG. 5 shows an overview 1100 of the editing process in accordance with the preferred embodiment of the present invention. Initially, a production set-up step 1101 occurs allowing the user to select desired visual, audio and/or textual elements for a production, Next, scripting processes 1102 are applied to the user selected elements. These scripting processes 1102 include the beat synchronisation process and the transition generating process previously described with reference to FIGS. 3 and 4 respectively. Without departing from the spirit and scope of the present invention, other scripting process can be applied. For example, an editing process that edits by manipulating picture elements of a frame of a video clip or still image. The output of a scripting process is preferably an input script substantially as described with reference to FIG. 2.

Input scripts, resulting from the scripting processes 1102, are processed at a next step 1103 where each input script is interpreted by a script interpreter. A decision step 1104 is entered which decides for each input script whether or not an output from an input script is to be rendered to an output device. If the answer to the decision step 1104 is "no", the flow process, described with reference to FIG. 5, is looped back to the production setup step 1101 for additional desired selections by the user. However, if the answer is "yes" at step 1104, that is an output is to be rendered to an is output device then each input script, comprising elements of a production, is then rendered at step 1105 to a corresponding output device. For example, for an input script comprising audio elements and video elements, the audio elements are rendered to an audio output device and a video portion of the video elements to a display device, while a sound track associated with the video element is also rendered to the audio output device. Although FIG. 5 refers to a single interpreter, typically one interpreter will be provided for each type of source data and for the corresponding output device (eg. audio, visual).

A final decision step 1106 checks if the production is finished, or loops back to the production setup step 1106 if it is to continue allowing user selections. the loop back allows for a preview of the production by the user. At the production setup step 1106, the user is also permitted to select which scripting process is, or is not, to be applied, For example, the user may desire that no beat synchronisation be performed and so this option is switched off. Further, the user can also select desired output devices.

Figure 6:
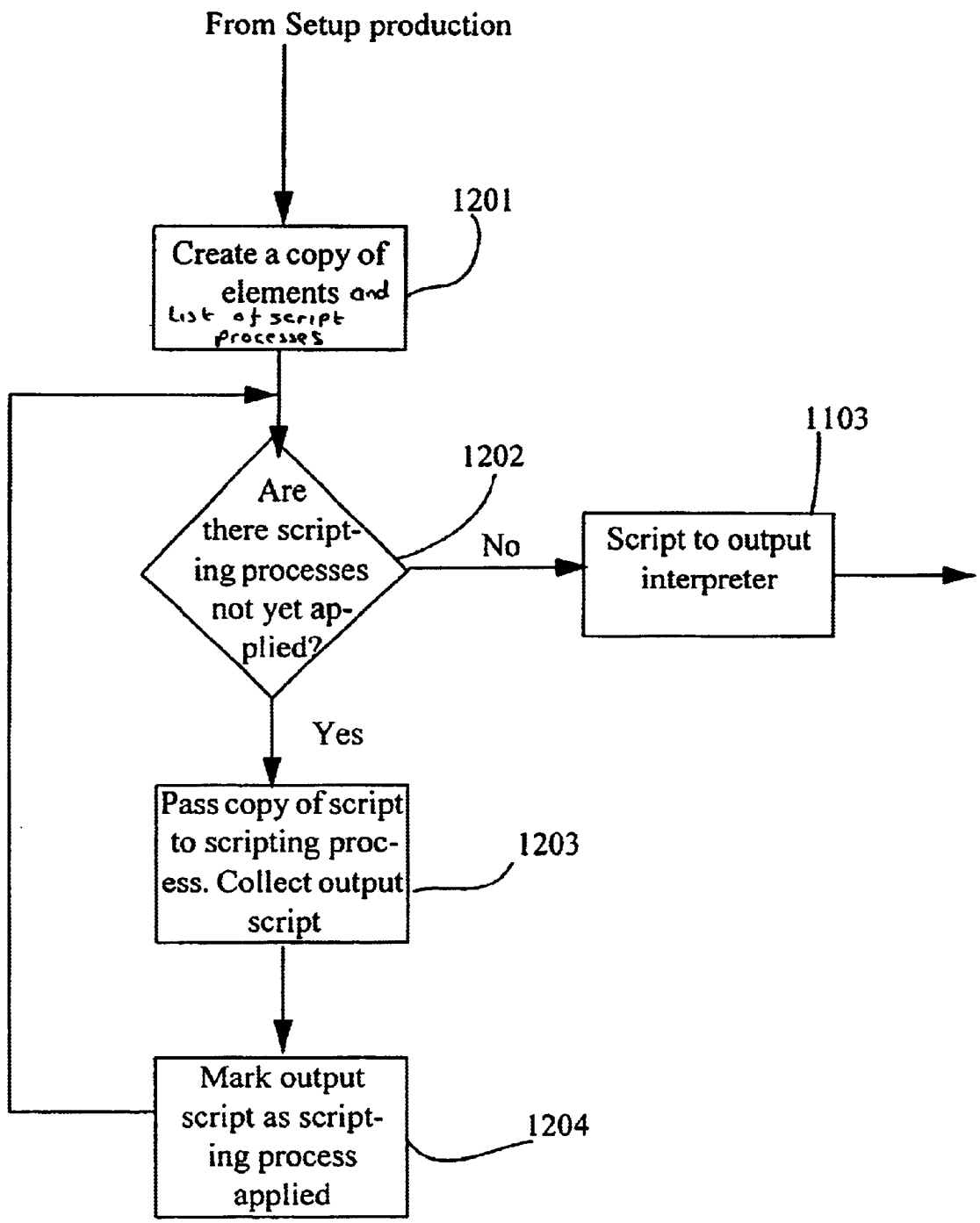
FIG. 6 is a flow chart a portion of the editing process of FIG. 5 in more detail.

Turning to FIG. 6, there is shown the "apply scripting processes step" 1102 of FIG. 5 in more detail. At a first step 1201 a copy of user selected elements is made, to avoid altering of original elements, and a list of scripting processes to be applied is created. Next, a decision step 1202 determines whether or not all scripting processes on the list have been applied. That is, the decision step 1202 determines whether the list of scripting processes contains any scripting processes not yet applied. If the answer is "no" that is, all scripting processes have been applied, then the input scripts generated by the scripting processes are sent to the script interpreter as described with reference to FIG. 5. However, if not all of the scripting processes (on the created list) have been applied, at decision step 1202, then the copied elements are passed to a corresponding scripting process 1203. For example, if a beat synchronisation process is to be applied to a current copied elements then the elements are directed to the beat synchronisation process. A next step 1204 is to mark off the list an applied scripting process and loop back to the decision step 1202 to assess whether another scripting process is to be applied. When no more scripting processes are to be applied a final generated input script is sent to the script interpreter for processing 1103 (see FIG. 5).

A predetermined set of rules may now be defined to guide the creation of a production from a collection of elements, however this set of rules should not to be seen as limiting and is only offered by way of example. The examples of the rules that can be used in conjunction with the preferred embodiment, are described below, however the type of rule depends on the final production effect to be achieve. It will therefore be appreciated by those skilled in the art that a different combination and/or variety of rules can be applied without departing from the spirit or scope for the present invention. For example, a rule can be created that designates that titles or text information to be rendered, to a video screen, as overlay on a video clip, can be overlaid on a portion of the video screen where it is determined that the average motion, over the entire video clip, is least. The type of rule also depends on the type of content information to be extracted from the different and various elements. The proceeding sections describe different content information extracted for the various elements and associated rules which are used to create, or assist in the creation of, a production.

Beat Synchronisation

Figure 7:
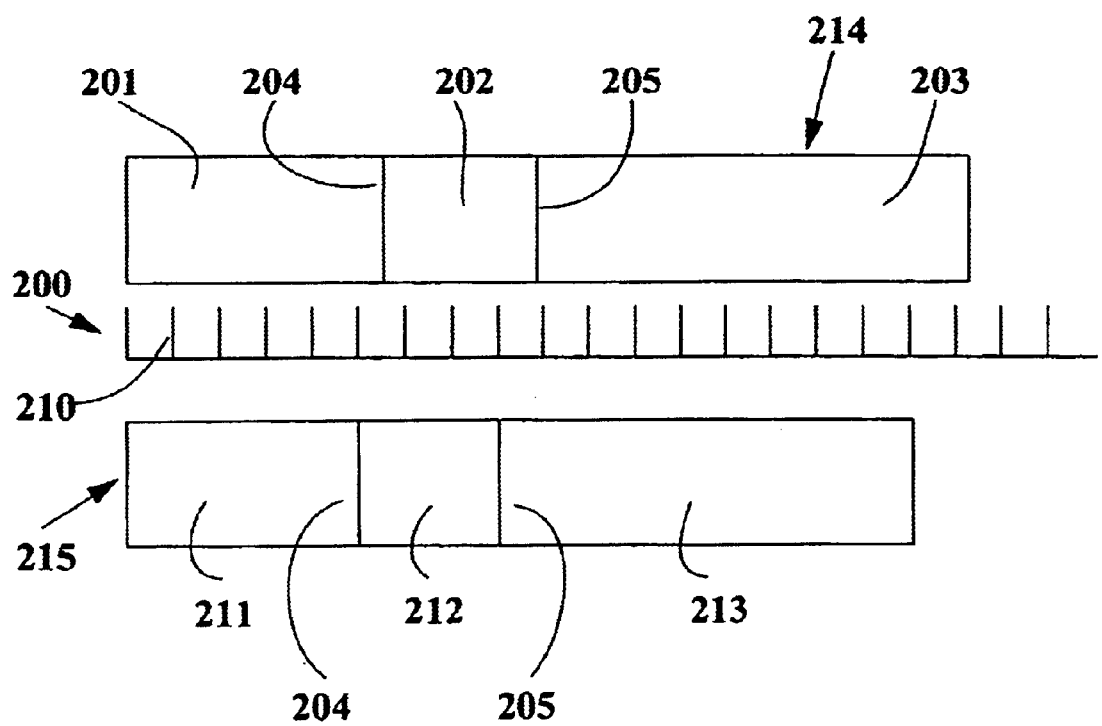
FIG. 7 illustrates an example of beat synchronisation between multimedia elements in accordance with the preferred embodiment.

Referring to FIG. 7, there is shown an example of automatic beat synchronisation between an audio tract 200, having a beat 210 represented thereon, and a video clip (or video footage) 214. Typically, the audio track 200 for which a beat is sought and used to synchronise with a video clip 214 is a musical piece. The beat is preferably a musical beat of the musical piece represented by the audio track 200, however any substantially regular frequency extracted from the audio track 200 may suffice as the beat for the purpose of synchronisation.

An example of a technique for extracting the beat to allow synchronisation of video clips will now be described. An input audio signal representing the audio element of a production and in particular a section of the audio signal for which a beat is desired, is analysed through a bandpass filter to restrict frequencies of the audio signal to a predetermined range. The restricted frequency signal is passed through a lead edge detecting circuit that detects a lead edge of the restricted frequency signal. Time intervals between each detected lead edge, for the duration of audio signal, for which a beat is sought, are recorded and then an average time interval is calculated. This average time interval can then be used as the beat to synchronise the musical piece to a desired video clip.

The video clip 214 of FIG. 7 represents an untrimmed video footage before it is trimmed to be synchronised with the beat of the audio track 200. In this example the untrimmed video footage 214 comprises three sections 201, 202 and 203 which represent predetermined scenes of the video footage 214. Transitions between the scenes, in this example, are formed by butt editing the scenes together. That is, three sections, each section typically comprising a plurality of frames, have been joined together end on end.

Transitions between sections 201, 202 and 203 of the untrimmed video footage are represented in the illustrated example of FIG. 7, by vertical lines 204 and 205. The transitions of the untrimmed video footage 204 do not coincide with a beat 210 of the audio track 200. The first section 201 of the untrimmed video footage 214 is trimmed so that the resulting section 211 has a transition 203, to a next section 212, coincident with a beat 210 of the audio track. Similarly the remaining sections 202 and 203 are trimmed to result in sections 212 and 213 respectively, so each transition between sections 211, 212 and 213 occur in synchronism with the beat 210 of the audio track. The trimmed sections 211, 212 and 213 together form a video clip (footage) where transitions between events or changes in scene are synchronised to the beat 210 of the audio track 200. As described in FIG. 3 at step 1413, when trimming video footage and video frames are removed from each section trimmed, such frames can be removed from any portion of the section. However it is preferred that a content of the section is evaluated for predetermined effects and the frames removed are removed so as to cause least disruption to the eventual viewing of the production. For example, if a section of video footage has a zoom or pan then it may be desirable to remove frames which are not intermediate a zoom or pan. Another example would be to assess from a video footage which portion has least motion occurring, that is, the portion of video footage which is essentially a still shot, and remove a frame substantially from the portion of least motion, Alternately, frames which are out of focus in a predetermined section of video footage may be removed.

Further when synchronising the video footage 214 to the audio track 200, it is permissible to process the audio track 200 to increase or decrease an average time interval between beats to the extent that the audio track is not substantially distorted, so as to fine tune a synchronisation between the audio track 200 and the video footage 214. As mentioned previously it may also be appropriate to process the video to speed-up or slow-down without editing.

Transition Speed and Timing Rule

Generally a video frame rate (frames/second) is substantially constant, therefore a predetermined number of frames of a video footage substantially defines a specified interval in time. A time interval and hence a transition speed between a first section and a second section of a video footage will then depend on a number of frames of the video footage used in a transition. A transition can be a simple transition from one scene to another scene of the video footage, resulting from a "butt edit" of two section as described with reference to FIG. 7. However, preferably a transition is purposely designed to provide a special effect such as a dissolve transition from one scene to a next scene. Other transition types include a "wipe", and a "fade in" which allow a change of scene with a predetermined special effect, A timing and speed of such transitions are synchronised with a predetermined audio track in accordance with the preferred embodiment and in a substantially similar manner as that described above under "beat synchronisation", excepting that video frames can be duplicated and added, as well as removed, to effect a smooth synchronised transition. A timing and transition speed rule is applied to start a selected transition at a first predetermined beat marker and ensures, by allowing a predetermined number of frames to effect the transition, that an end frame of the transition is coincident with a second predetermined beat marker. Audio transitions may be achieved by arranging respective beats to be coincident during the crossover.

Audio Level Adjustment

Figure 8:
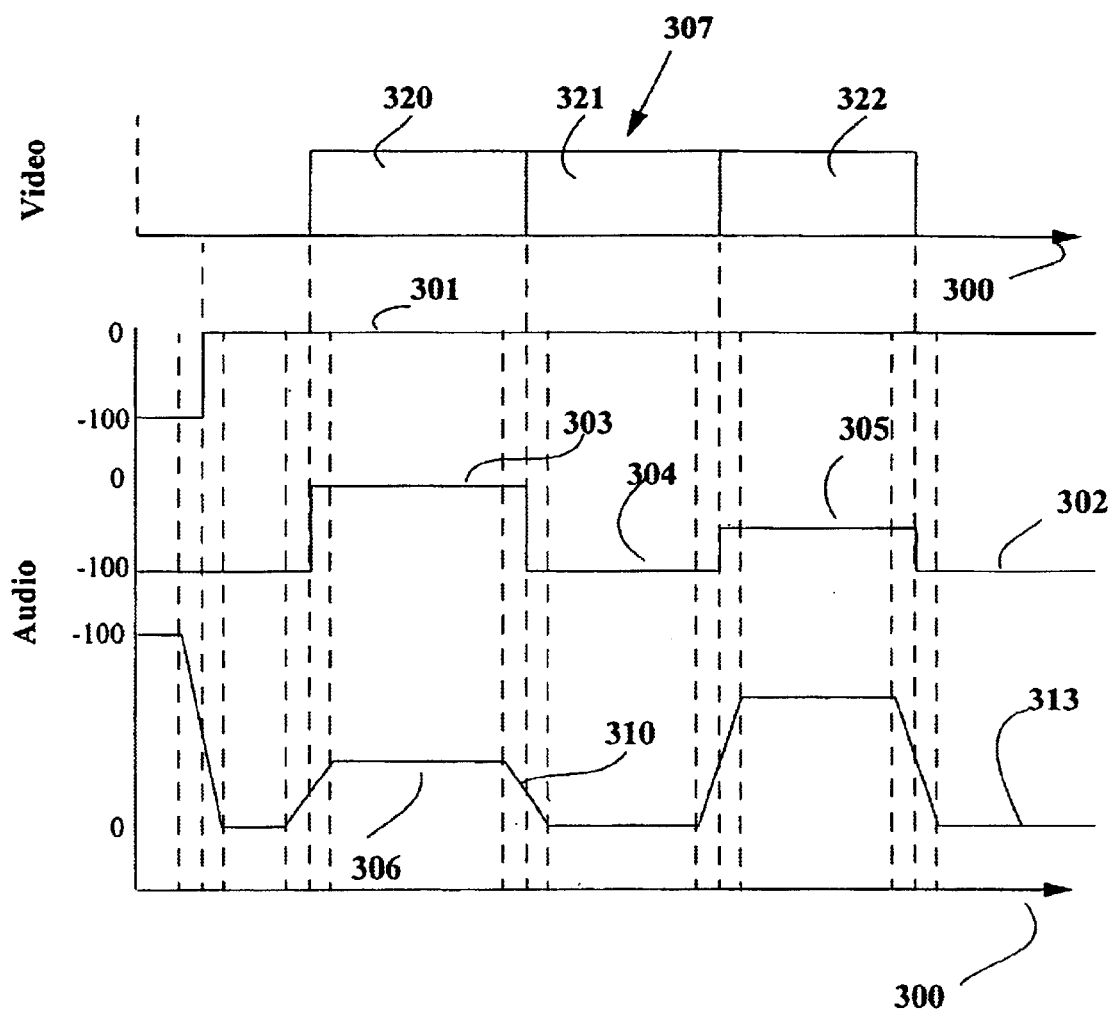
FIG. 8 illustrates an example of audio level editing in accordance with the preferred embodiment.

Referring now to FIG. 8 there is illustrated a representation of audio level information 301 of an audio backing track and a sequence of video clips 320–322 which are to be associated with the audio backing track. A horizontal axis 300 of FIG. 8 is a time lapsed axis 300 and a vertical axis represents audio levels measured in decibels (dB) (note: FIG. 8 is not drawn to scale). A familiar feature of video cameras is their capability to record sound as well as video. However, when putting together a production it is usually desired to include a further audio channel which is an audio backing track. Additional backing tracks that provide background audio are common feature in professionally prepared video productions, such as a professionally edited wedding video, however such video editing is a laborious task which is painstakingly put together by a video editor skilled in the art.

In the preferred embodiment of the present invention, transitions between video clips 320 to 322 are automatically detected and the audio levels are also automatically detected. For example an audio level 303 corresponding to video clip 320 is detected to be zero decibels (0 dB), an audio level 304 corresponding to video clip 321 is detected to be absent and so is set to –100 db and for video clip 322 an audio level 305 is detected at –3 db.

When rendering a production video, a final attenuation waveform 313 is generated with predetermined "ramping" 310 at each point 311 corresponding to a video transition from one clip to the next. The final attenuation waveform 313 is used preferably to control a level setting for one or more musical scores used as backing track to the video footage 307. Further, the attenuation waveform may be applied to the backing track so it remains at a fixed distance from audio associated with the video. In addition, the user sets a desired audio difference level between the video camera recorded sound and the audio level of the backing track so that the recorded sound is not obscured by the backing track if this is so desired.

Music Matching

In the preferred embodiment, a first music track is selected and can be used to find and select from a plurality of music tracks, predetermined music tracks which are substantially similar to the first music track. These predetermined musical tracks can, optionally, be used together with or instead of the first music track selected. A technique determining substantially similar musical tracks, from a plurality of music tracks, is based on characteristics of audio signal of each music track in comparison with characteristic of the first music track selected. The characteristics include such features as average volume, beat, and dominant frequencies for example, either singularly or in combination. An example of how this music matching rule is applied in connection with a video production is now described. A template for a video production is supplied, say by a manufacturer, with a first music track selected, A user can offer a plurality of alternative music tracks which the user prefers over the first music track supplied with the template. The music selection rule selects based on one or more predetermined characteristics of the first track, a most appropriate music track from the plurality of alternate music tracks.

Visual Content and Motion

In video footage, a plurality of significant visual events may be relied upon to identify segments of the video footage for which predetermined special effects are, optionally, applied. For example, motion detection techniques, known in the art, are applied to the video footage to guide the type of transition that is preferred between a video segment (clip) and a next video segment.

Figure 9:
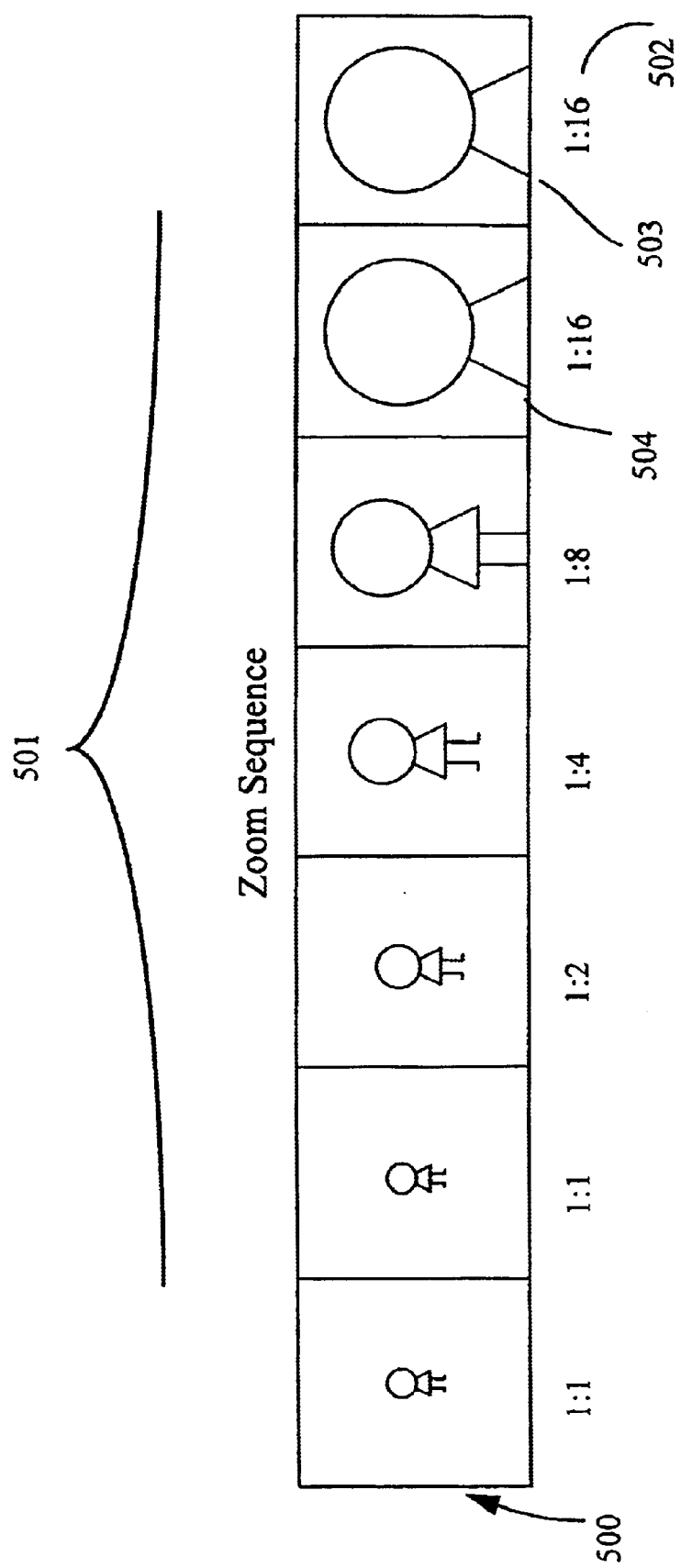
FIG. 9 illustrates an example of a zoom sequence forming part of a visual element.

Referring now to FIG. 9, there is shown a video footage 500 incorporating a video zoom sequence 501 for which relative zoom ratio 502 are represented below each frame 503. The relative zoom ratio 501 is determined using motion vectors detected for each frame. Without departing from the scope or spirit of the invention, relative zoom ratios 502 can be computed, for example, from metadata encoded and associated with a video footage.

The encoded metadata may be obtained and recorded from a video camera, for instance, adapted with zoom sensors and circuitry capable of providing metadata on a state of a current zoom.

Figure 10:
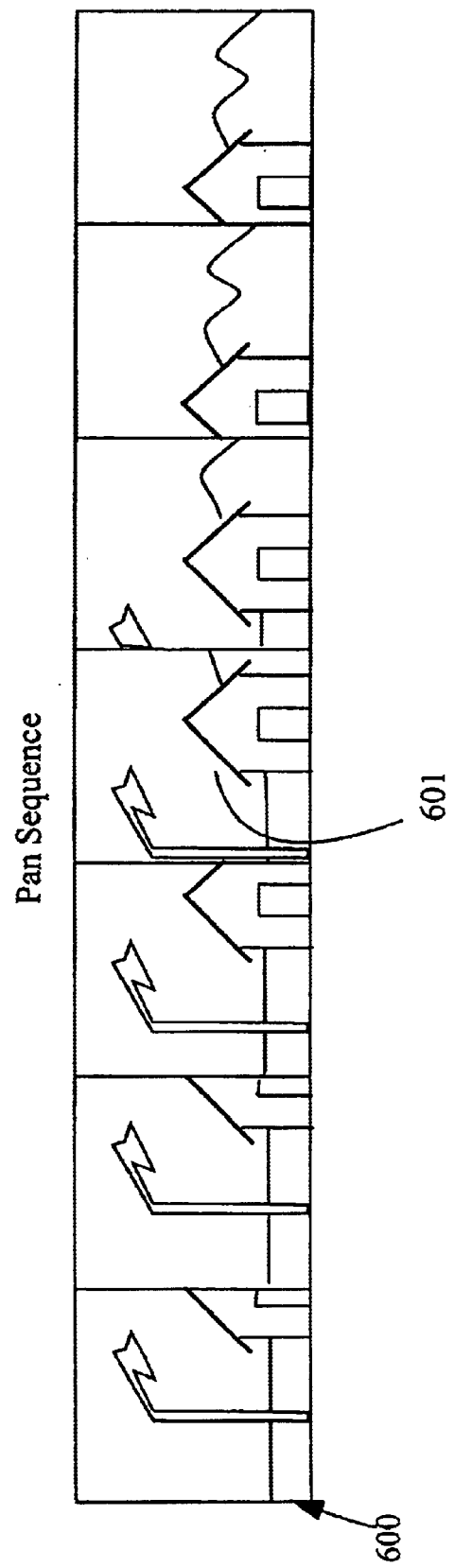
FIG. 10 illustrates an example of a pan sequence forming part of a visual element.

Turning to FIG. 10, there is shown a "pan shot" 600 comprising a video pan sequence of a cottage 601. In substantially the same manner as described with reference to the zoom sequence 501, the pan shot can be detected from motion vectors. Optionally a panning sensor on a video camera can provide movement information of the video camera that can be used to determine an amount of panning in a "pan-shot".

In the detection of zooms and pan-shots from a video footage, a predetermined zoom threshold level and a pan threshold level is optionally set which allows the detection of a zooms only where a relative zoom ratio, within a predetermined number of frames, is above the zoom threshold level and detected pan shots where a relative pan movement, within a predetermined number of frames, exceeds the pan threshold level respectively. For example, a zoom threshold level set at 3 with a predetermined number of frames set at 2, then a relative zoom ratio greater than 1:3 occurring within 2 frames would result in a detection of a zoom sequence.

In each case where a pan shot or a zoom is detected, a user is optionally given a choice to accept, or reject, for marking the detected pan or zoom accordingly. However, the process of marking a video footage so as to indicate locations of a pan shot or zoom can alternately be automated so that each zoom or pan detected can be marked based on predetermined criteria.

Printed Summary of Video Footage

Figure 11:
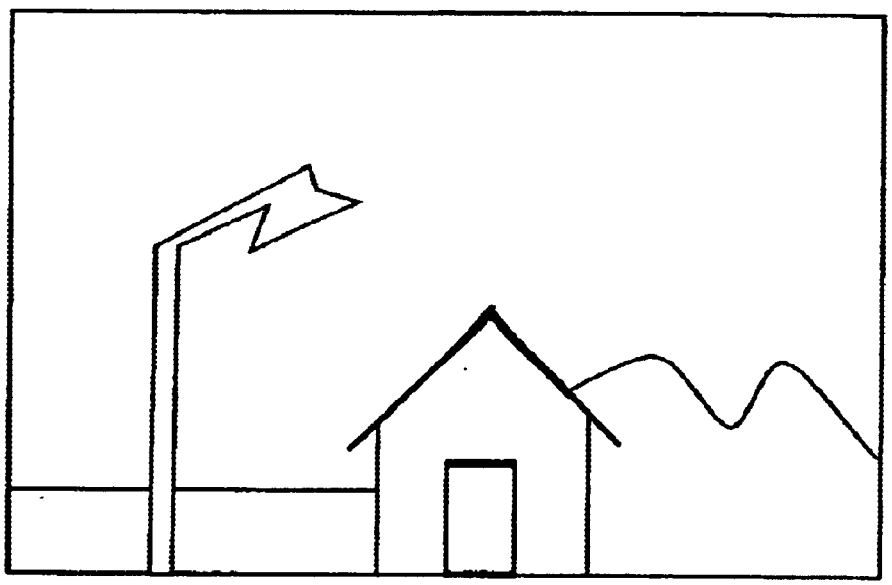
FIG. 11 represents an image derived from "stitching together" the pan sequence of FIG. 10.

The marking of pan shots and/or zooms is to readily identify those segments of video footage to which a special effect is to be applied or those segments of the video footage that are to be retrieved for printing, on a print device, or to generate icons for the footage. For example, the pan shot 600 of FIG. 10 is "stitched together", that is, composited frame by frame to build up a still image pan as illustrated by FIG. 11. This process of stitching together video frames is known to those in the relevant art and can be done, for example, by determining a translation of predetermined picture elements, in a digitised representation, of each frame of the video footage.

Figure 12:
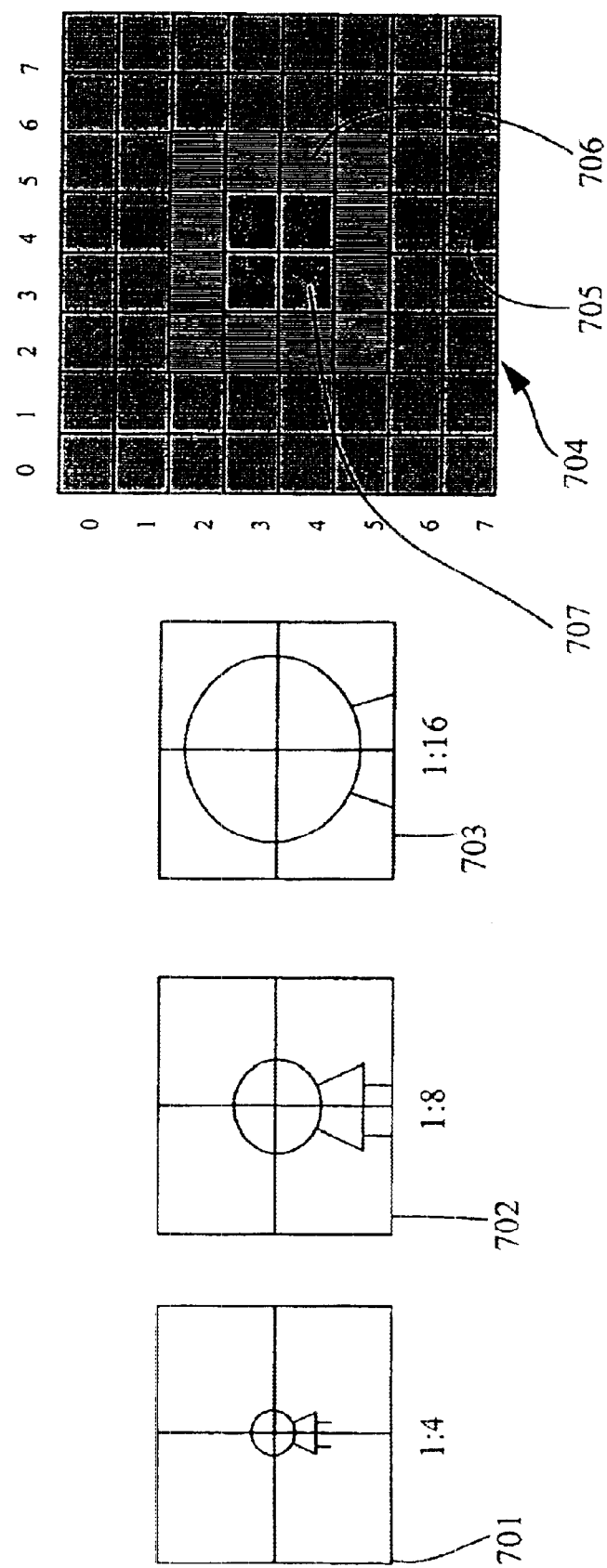
FIG. 12 represents a salient still image derived from a compositing of the zoom sequence of FIG. 9.

Referring now to FIG. 12, there is shown a compositing of frames 701–703 of a video footage to produce a "salient still" image 704. Preferably the frames 701–703 to be composited into a salient still image, for printing on a print device, are extracted frames of a zoom portion of a video footage. Illustrated in FIG. 12 are three frames 701–703 selected from the zoom sequence shown in FIG. 9 and which are to be used to create the salient still image 704. To composite the salient still image 704, a first image represented by a frame 701 is scaled by a first predetermined factor and the scaled image used as a first portion 705 of the salient still 704. In FIG. 12, the first portion 705 refers to the 8×8 components as seen. Next, a second image represented by frame 702 is scaled by a second predetermined factor and the scaled second image is overlaid, or inserted, upon the first portion 705 to provide a second portion 706 of the salient still 704. Finally, a third image represented by frame 703 is overlaid (or inserted) upon the second portion 706 to provide a third portion 707 of the salient still 704. The resultant salient sill image 704 comprise three portions 705–706 of the image 704 derive from different resolutions, composited together to form a single salient sill image 704 which can be printed on a print device.

It is assumed that in a video footage where "pan shots" and zoom sequences have been detected, the photographer or cameraman taking the video footage had a desire to pan or zoom a particular scene and therefore there is a likelihood that the "pan shot" and zoom sequence of the video footage is of particular interest. Therefore images obtained from these particular scene are chosen for printing to a printer device as described with reference to FIG. 11 and FIG. 12.

Not all video footage includes pan shots and or zoom sequences and sometimes a pan or zoom does not contain images of particular interest. In these cases, images of the video footage intended for printing on a print device are selected based on motion analysis, or other characteristics of the video footage such as focus or slow motion blur. For example, determining local minima of motion occurring in select key frames is a good estimate that the cameraman has stopped (or paused) at an interesting point in a scene, or that characters pause on gestures to emphasise their importance, and therefore the selected key frames are of interest.

Motion Selected Transition

Figure 13:
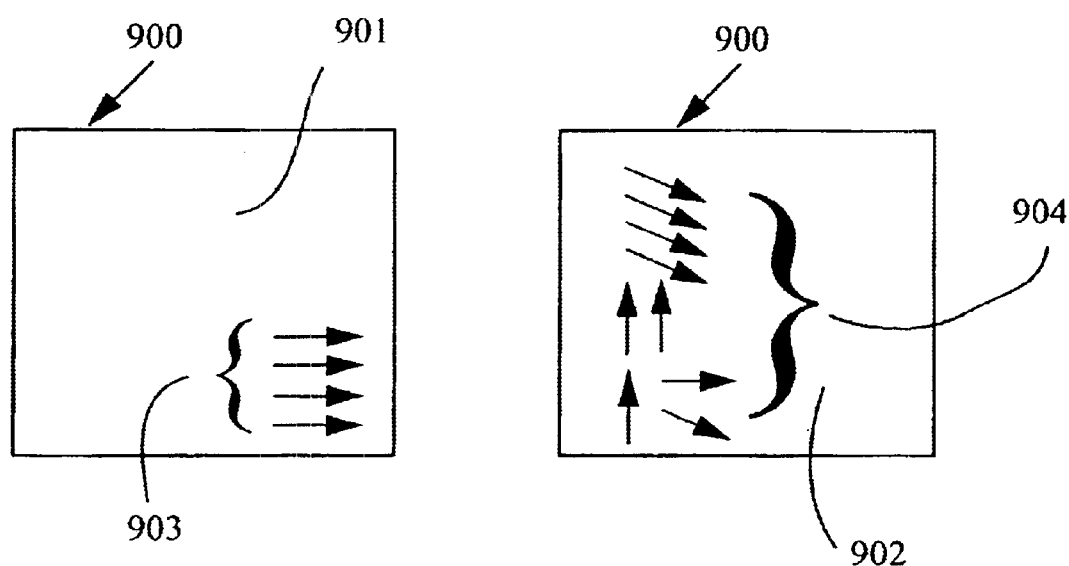
FIG. 13 represents motion vectors of two video sequences indicating a motion when the video sequences are rendered to a display device.

Referring to FIG. 13 there is illustrated a display device 900, displaying a first video segment 901 and at some time latter displaying a second video segment 902. The first displayed video segment 901 comprises motion occurring at a bottom right hand corner of the display 900. The motion is represented at the bottom right hand corner of the display 900 by a first set of motion vectors 903, A second set of motion vectors 904 for the second video segment 902 displayed on the display device 900 indicates that motion between the first 901 and second 902 video segments have changed from the bottom right hand corner of the display 900 to a left hand portion of the display 900.

A transition thus needs to occur if the first 901 and second 902 video segments are displayed consecutively, In accordance with the preferred embodiment, a transition type is chosen according to a location and an amount of motion on video segments to be displayed. Transition types, between a first video segment and a second video segment include: wipes which can be vertical, horizontal and or oblique; fades; and alike transitions.

Figure 14:
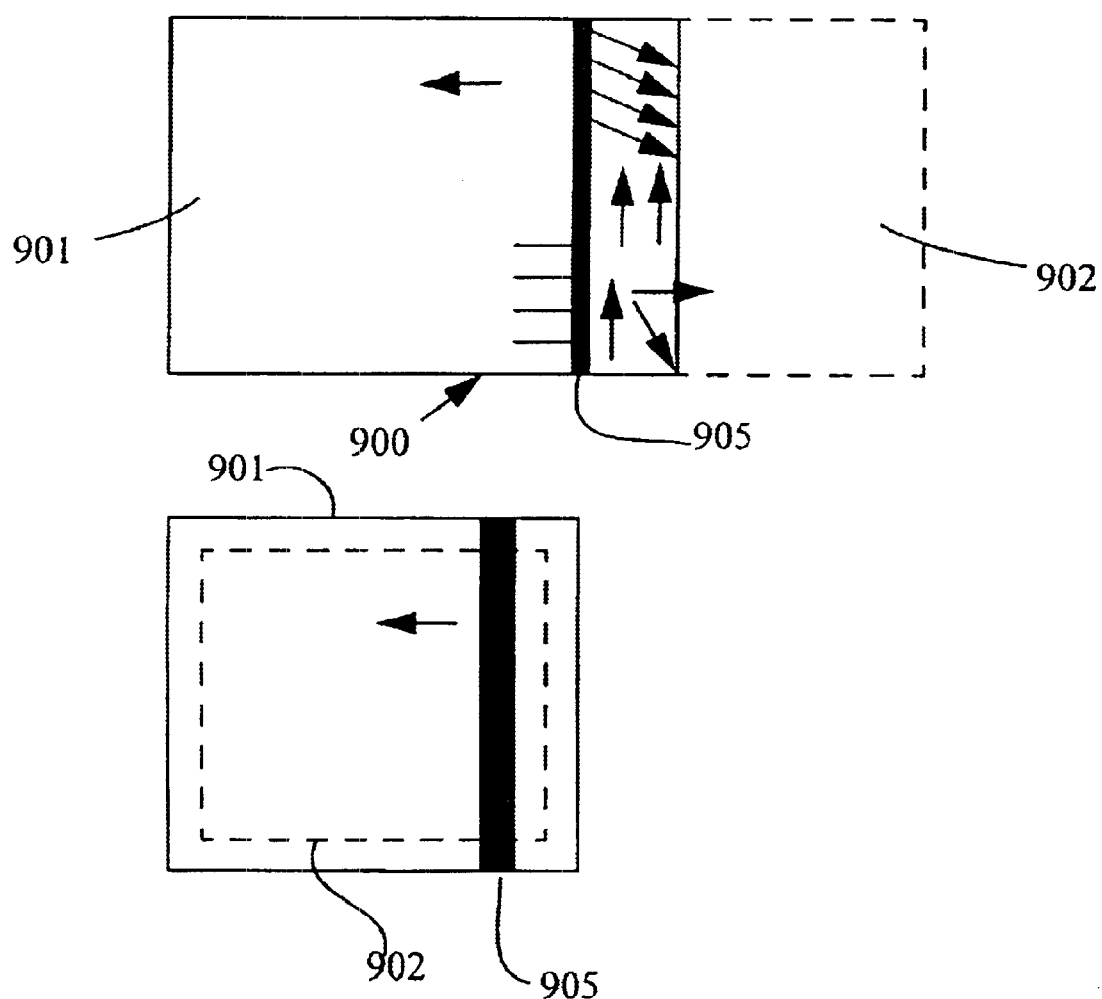
FIG. 14 represents an example of a transition between video sequences (segments)

Turning now to FIG. 14, there is shown an example of horizontal wipe 905 transition for the video segments of FIG. 13. The first video segment 901 is the outgoing scene while the second video segment 902 is the incoming scene of the transition 905. A horizontal wipe transition from right to left, on the display device, is automatically suggested (or chosen) because of the location of the motion in their respective video segments 901,902. The horizontal wipe transition 905 from right to left effectively transfers a viewers attention from the motion occurring in the first video segment to the motion occurring in the second video segment 902 and maintains the viewers attention while the transition occurs, slowly, across the display 900. The type of transition is chosen on the basis of a location and an amount of (visual) motion occurring between video segments. Those skilled in the art will recognize that a multitude of types of transitions can be devised, and corresponding motion rules associated to select a transition type, in place of the example described above, without departing from the spirit and scope of the present invention. For example, if visual characteristics are such that two connective video segments (clips) comprise a majority of a motion, and each segment is centrally localised, then a possible transition is that of fading-out a first video segment while fading-in a second video segment.

Colour Content

Another automated editing process based on a content of an image, in accordance with the preferred embodiment, is a selection of colours. For example, a selection of colour(s) for an opening title of a video production can, if a user so desires, be selected on the bases of statistical colour content information about an introductory portion of a video segment or on an entire video footage. Colours for titles, for example, can be selected from a complementary set of colours or a supplementary set of colours. The complementary and supplementary sets of colours are preferably chosen for a plurality of colours available in the video footage.

Figure 15:
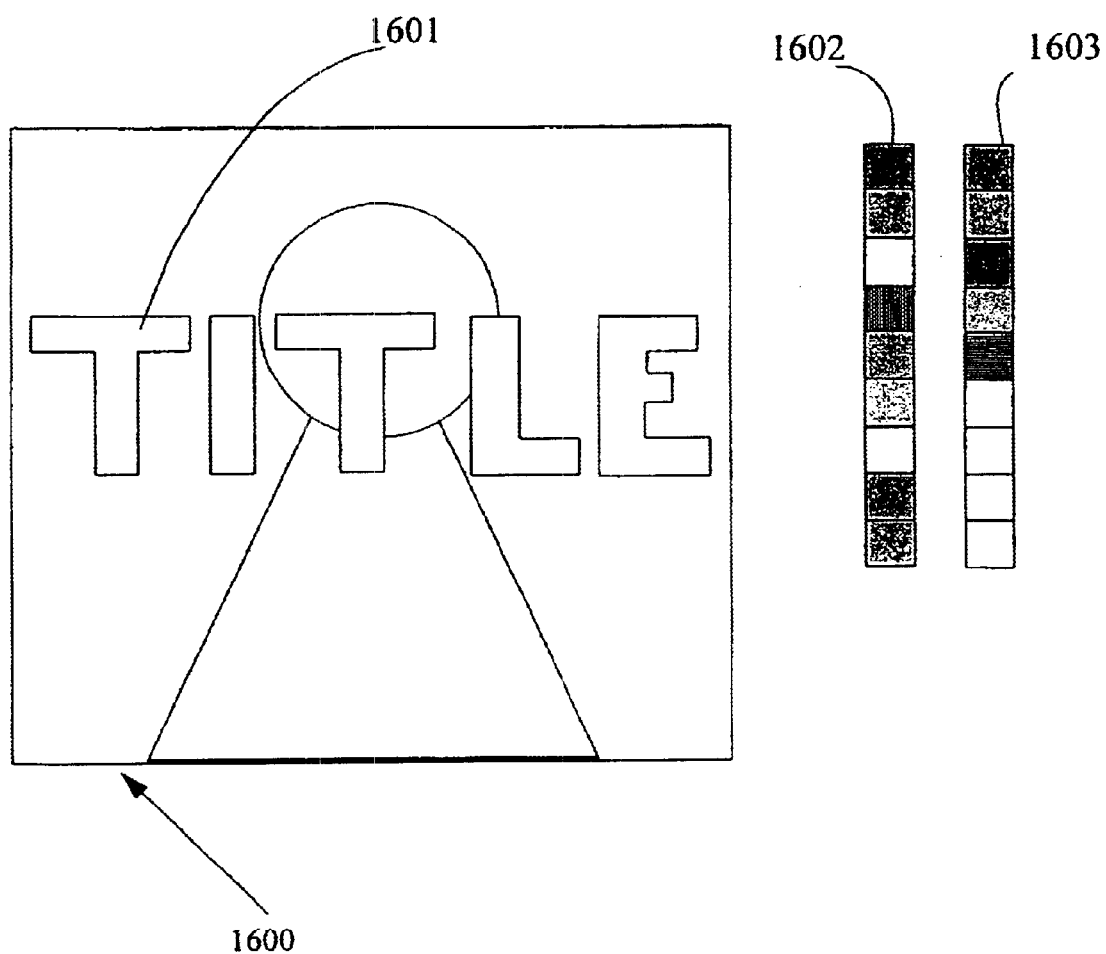
FIG. 15 shows an example of an image and overlay graphics "TITLE" wherein a colour of the overlay graphics is chosen in accordance with the preferred embodiment.

Referring now to FIG. 15, there is shown an image 1600 with text 1601 "TITLE" overlaid upon the image 1600. The image 1600 may represent a printed image, a still image displayed on a display device or a predetermined portion of a video footage rendered and displayed on a display device.

Also shown in FIG. 15 are two sets of colours, those being a set of complementary colours 1602 and a set of supplementary colours 1603, which are to be used to provide a colour palette for the text 1601. The complementary 1602 and/or supplementary 1603 colours are selected based, on colour content information of the image 1600. There are know techniques for determining dominant colours of an image for example, in a simple case an averaging of colour over predetermined regions of the image can provide a determination of dominant colours.

Figure 16:
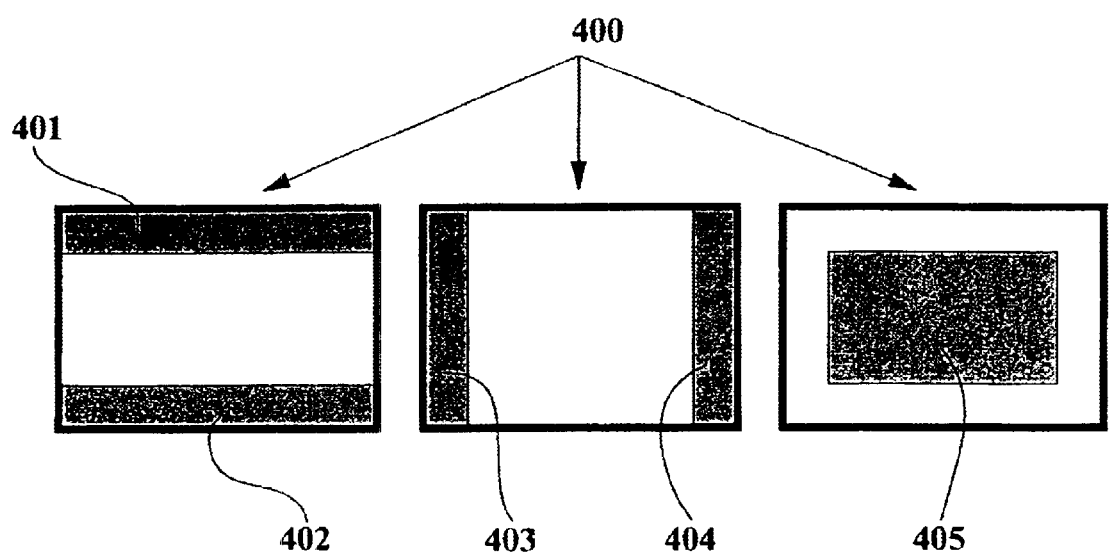
FIG. 16 illustrates an example of likely areas of interest for extracting colour content information from an image.

Referring to FIG. 16, there is shown a display device 400, with various portions 401 to 405 of the display 400 where a colour content of an image may or may not be of interest. For example, if graphical elements are to be used in a manner analogous to headers or footers of a document, the portions of an image where colour content information would be extracted is indicated by regions 401 and 402. Similarly, if text information (or graphical elements) is to be displayed at the left portion 403 or the right portion 404 of an image then colour content information is preferably extracted from these respective portions 403 and 404. Finally, if text information is to be centrally located, a centre portion 405 of the image is the portion from which colour content information is extracted. Colour content information is also used, in accordance with the preferred embodiment of the present invention, to guide a selection of a type of transition between video segments as previously described. Motion and/or colour content information can be used to select the type of transitions between video segments. An example of use of colour content information for selecting a transition type is, selecting a dissolve transition between a first video segment and a next video segment, where an average colour or alternatively luminance content of the first video segment is determined to be substantially similar to an average colour content of the next video segment.

Figure 17:
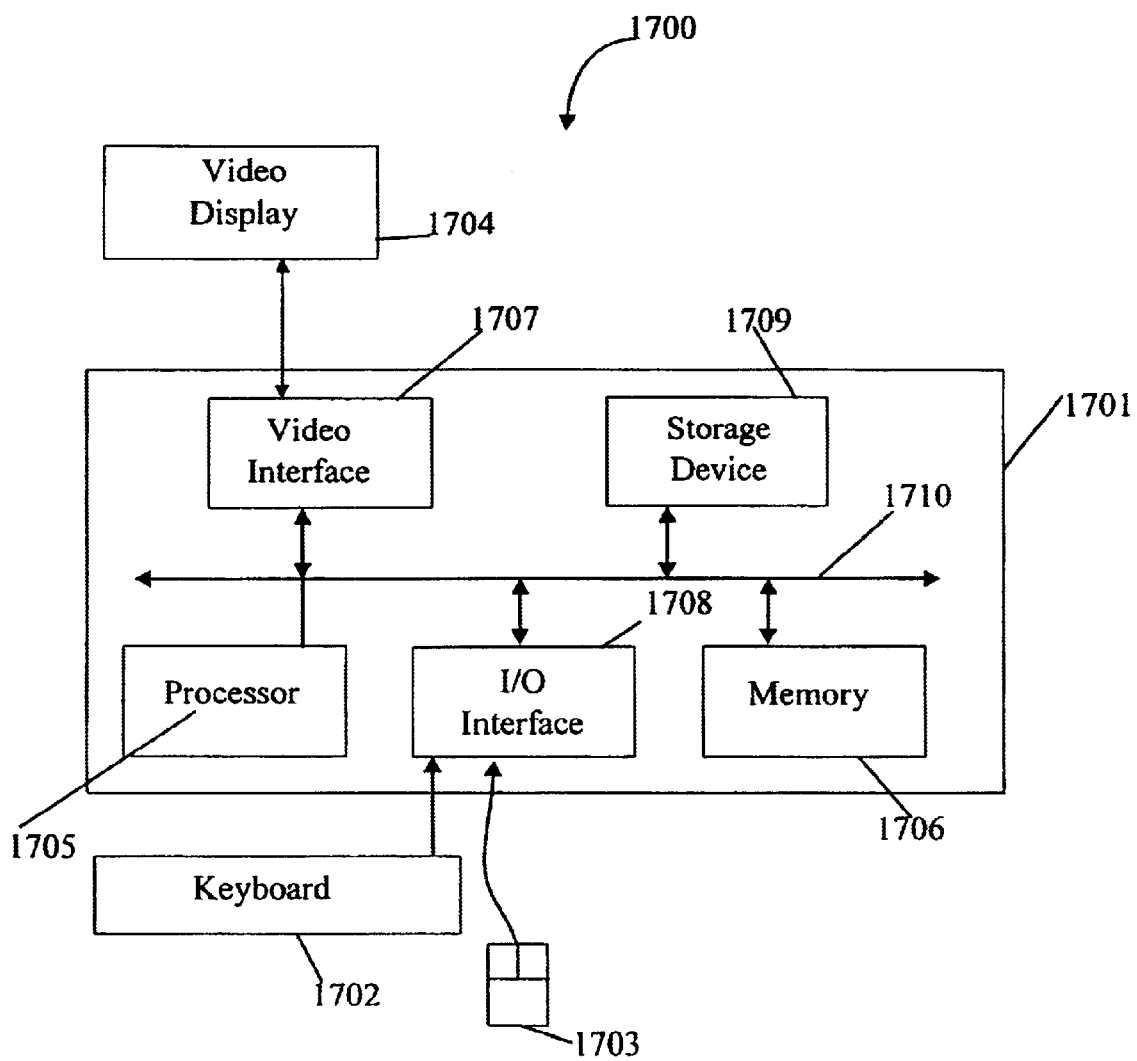
FIG. 17 is a schematic representation of a computer system used to implement the preferred embodiment.

The embodiment of the invention can also preferably be practised using a conventional general-purpose computer, such as the computer system 1700 shown in FIG. 17, wherein the processes described with reference to FIG. 2 to FIG. 6 are implemented as software executed on the computer system 1700. The computer system 1700 includes a computer module 1701, input devices 1702, 1703 and a display device 1704. The computer module 1701 comprises at least one processor unit 1705, a memory unit 1706 which typically formed of semiconductor random access memory (RAM) and read only memory (ROM), input/output (1/0) interfaces including a video interface 1707, keyboard and mouse (or joystick) interface 1708 The storage device 1709 can include one or more of the following devices: a floppy disk, a hard disk drive, a CD-ROM drive or similar a non-volatile storage device known to those skilled in the art. The components 1705 to 1709 of the computer 1701, typically communicate via an interconnected bus and in a manner which results in a usual mode of operation of the compute system 1700 known to those in the relevant art. Examples of computers on which the embodiments can be practised include EBM-PC's and compatibles, Sun Sparcstations or like computer systems evolved therefrom.

Enhanced Gathering Apparatus

Figure 18:
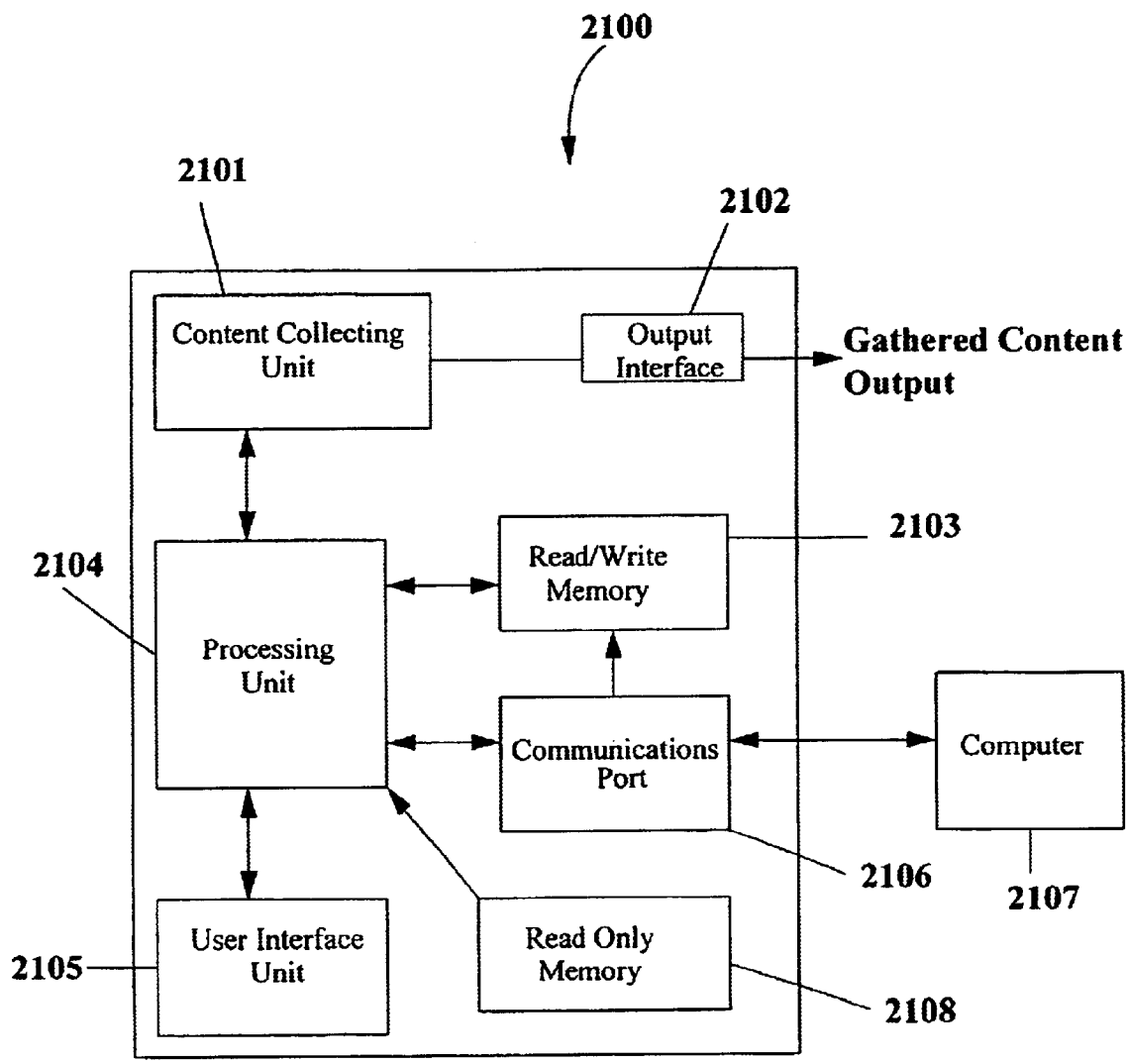
FIG. 18 is a block diagram representing an overview of an enhanced gathering device.

Referring to FIG. 18, there is illustrated a block diagram overview of an Enhanced Gathering device 2100, comprising a content collection unit 2101, a processing unit 2104, a memory storage unit 2103, a user interface unit 2105, a read only memory (ROM) 2108, a communications port 2106 and an output interface 2102, which is an example of an information gathering device.

Optionally, and depending upon a predetermined application of the enhanced gathering (capture) device 2100, the comununications port can be removed and the memory unit 2103 replaced with technology such as PCMCIA, bubble memory, a floppy disk or any portable memory device.

Generated (or gathered) output information can be communicated to external devices via the output interface 2102 and represents content gathered. The content gathered information can be used as input information to external devices. For example, external devices can include content,recording devices such as analogue or digital video records, optical disk drives, sound recording devices, image recording devices, printer devices or general purpose computers (eg. IBM compatible PC, Apple Compatible PC, Sun Workstation) to name a few. The content gathered information includes content data, and preferably metadata associated with the content data, An example of content data is image data gathered by a video camera device and the associated metadata can include such information as the date, time, camera settings and location where the image data was taken.

The Content Collecting Unit (CCU) 2101 preferably comprises a plurality of content sensors, each capable of receiving (collecting or gathering) predetermined forms of content information, Examples of such sensors include a microphone for receiving sound (content) data; a charge coupled device (CCD) for collecting image data; and a light sensor for determining and collecting lighting conditions (metadata) associated with collecting image data. Preferably, the CCU 2101 further includes elements (transducers) that gather sensory information about a current state of various content sensors, or associated hardware such as the current zoom factor on a video camera. This additional data is typically available for use by the processing unit 104 and can be encoded as part of the metadata in the gathered content information.

At a functionality level, a user selects at least one of a plurality of optional templates which are made available to the user through the user interface unit 2105. The user controls the enhanced gathering device 2100 through a series of selecting buttons (not illustrated) to make a desired template selection. The processing unit 2104, in communication with the memory storage unit 2103 and/or the ROM 2108, provides, via the user interface unit 2105, the various optional templates currently available on the enhanced gathering device 2100.

Each template typically comprises a series of template instructions which can be described by a predetermined programming language. For example, the programming language may be specific to an application and proprietary to the device 2100 or can be an implementation of a general purpose programming language such as Java (Trade Mark of Sun Microsystems Inc). Template instructions are uploaded, via the communications port 2106, from a general-purpose computer system 2107 to the enhanced gathering device 2100 and are stored in the memory storage unit 2103.

Alternatively, cartridge systems which are commonly used for computer games and/or flashcards for storing the templates can be used as a plug in device to upload templates to the enhanced gathering device 2100. Preferably, part of the series of template instructions, in particular, instructions which are common to several templates can be stored in Read Only Memory 2108 to reduce the amount of (RAM) memory required in the storage unit 2103. The template instructions are then available to the processing unit 2104 for runtime calculations. Preferably, the general purpose computer system 2107 illustrated in FIG. 18 is also used as the external device previously described which interfaces with output interface 2102 to download the content information.

A user interface device 2105, for instance, comprising a liquid crystal display (LCD) and a series of control buttons, is used to convey (messages) information to the user, as well as gathering user input in response to those messages.

The processing unit 2104 interprets the template instructions to provide options including content analysis of the content information, presenting to the user various choices for selection of menus available and interpreting a response to the menus from the user. The choices selected by the user, influence or change: the current state of the CCU 2101; user preference settings; and/or the current template being used by the device 2100. Preferably, some of these tasks are fully automated in that the template makes the best decision from the content information available and adjusts the CCU accordingly. For example, in a first embodiment of the enhanced gathering apparatus described hereinafter, the template may be used to decide from predetermined conditions that a portrait view of an image is desired over a landscape view and therefore a cropping of the image to a portrait view is performed if necessary.

Figure 28:
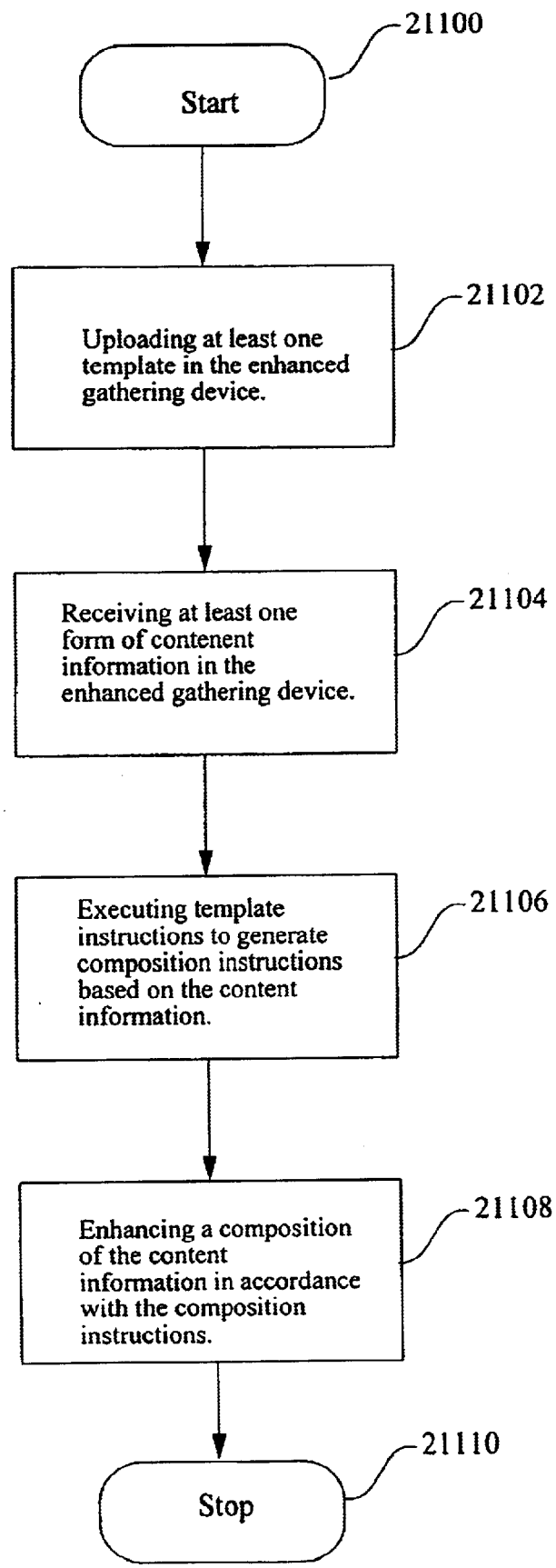
FIG. 28 is a flow diagram of the process of enhancing gathered information.

FIG. 28 is a flow diagram illustrating the general operation of the enhancing gathered information. The process commences at step 21100. In step 21102, at least one template is uploaded in the enhanced gathering device, In step 21104, at least one form of content information is received in the enhanced gathering device. In step 21106, template instructions of the uploaded template are executed to generate composition instructions based on the received content information In step 21108, a composition of the content information is enhanced in accordance with the composition instructions. In step 21110, processing terminates. Preferably, the method further involves storing the enhanced content information on a storage means and may optionally be downloaded to an external device.

First Enhance Gathering Apparatus

The first enhanced gathering apparatus is now described, by way of example, with reference to a Digital Still Camera where preferably the enhance capture (gathering) device 2100 is inbuilt or forms part of an enhancement system of the camera. In this example the content collecting unit 2101 comprises an optical lens system and CCD as is typical for such cameras and can further include distance measuring sensors, light intensity determination devices, focus detection devices and position locating devices (eg. Global Positioning System GPS). These sensors and devices gather image data, and metadata such as a location where the photograph was taken. The user interface unit 2105 for the Digital Still Carnera is a liquid crystal display (LCD) and preferably the user interface includes devices for entering data (eg. buttons). The communication port 2106 is used to upload one or more required templates, from a general purpose computer 2107, to be stored in the memory storage 2103.

Figure 19:
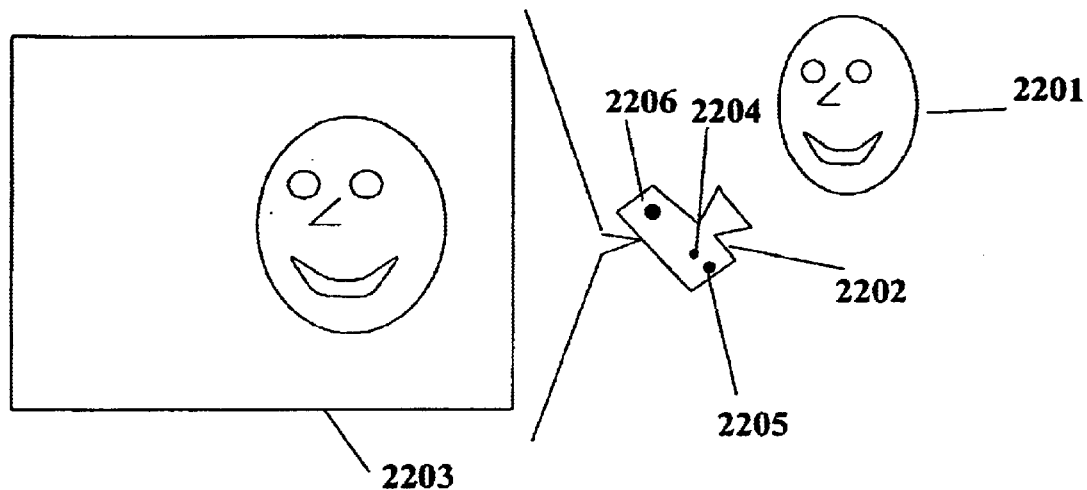
FIG. 19 is a representation of a Digital Still Camera, comprising the enhanced gathering device of FIG. 18.

FIG. 19 illustrates a schematic representation of a digital still camera 2202, used in taking a picture of the subject matter 2201. As a part of the digital still camera 2202 there is a LCD 2203, in which the image to be recorded is displayed. A user can elect to record the image by pressing shutter button 2206 or can enter a template mode by pressing a mode template button 2204. The user is allowed to exit the template mode by pressing the mode template button 2204 a second time.

Figure 20:
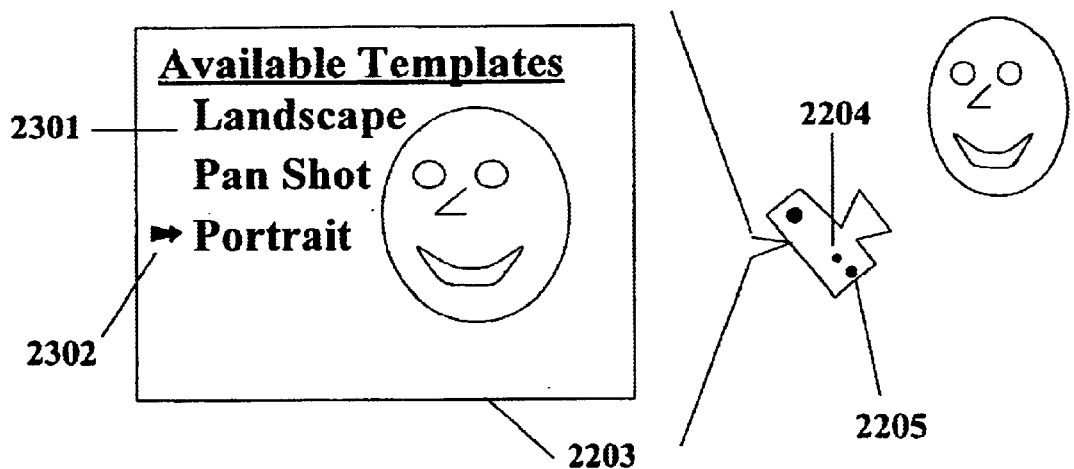
FIG. 20 illustrates a "Template selection" mode of the Digital Still Camera of FIG. 19.

Turning now to FIG. 20, upon pressing the mode template button 2204 a list of available templates 2301 is displayed on the LCD 2203. In this example, the templates include a landscape template, a pan shot template and a portrait template, having been previously uploaded as described above. A selector button 2205 is used to navigate through the available selections, and select the desired template. A selection arrow 2302 displayed on the LCD 2203 indicates a current template mode selection.

Once a selection of template is made, for example selecting the Portrait template, the image displayed on the LCD is analysed by the processing unit 2104. The results of the analysis are used by the template to guide the user. In this example, the portrait template requires that for best results the subject matter 2201 should be centred and occupy at least a predetermined percentage of the visible area of the display (ie. image to be recorded).

Figure 21:
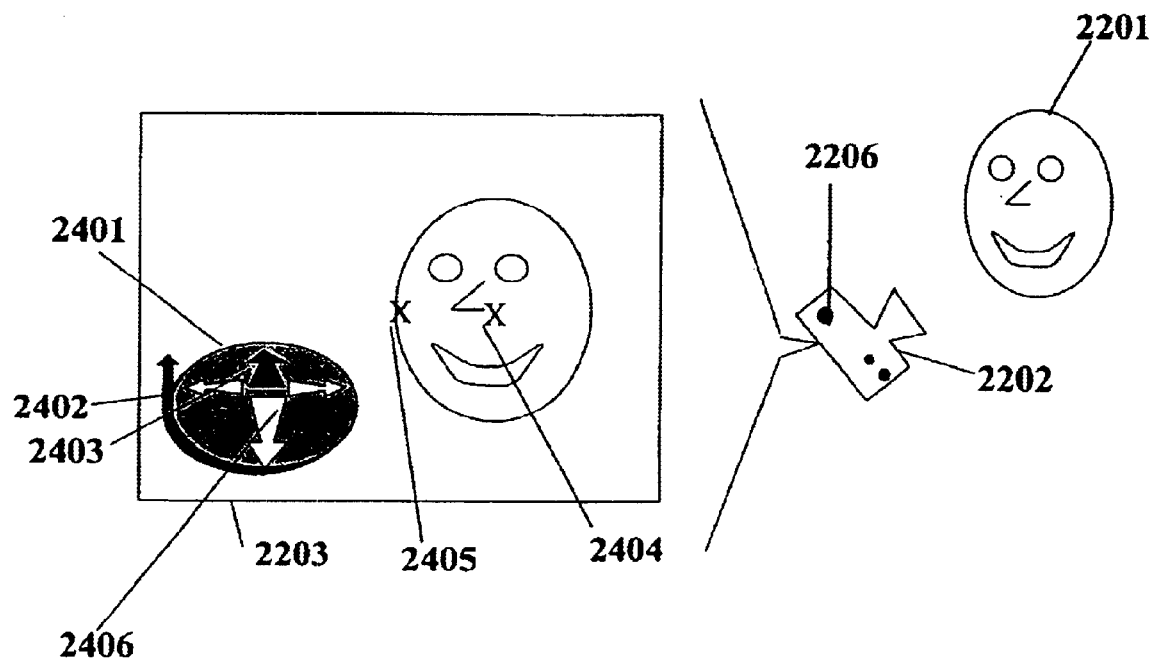
FIG. 21 illustrates composition features, "Orientation Guidance" and "Alignment", of the Digital Still Camera of FIG. 19.

Referring now to FIG. 21, there is shown the LCD 2203 after the Portrait template has been selected. A number of elements appear on the liquid crystal display 2203 including a positioning indicator 2401, a line up marker 2404 and a centre marker 2405 which would not appear on a photograph (or recorded image), should the user desire to take a record of the image by pressing the shutter button 2206. Preferably, details of the current status of the positioning indicator 2401, the line up marker 2404 and the centre marker 2405 are generated and included as metadata, and associated with the corresponding image, for later use or evaluation. For example, if the user has not correctly aligned the relevant markers 2404, 2405 and/or positioning indicator 2401, and the content collecting unit is capable of gathering a larger view of an image than is desired, then the information part of the metadata, relating to the markers 2404, 2405 and the information of the positioning indicator 2401, can be used to evaluate a preferred print area for the image. The image can then be cropped to a predetermined print area.

Preferably, the image and corresponding metadata is first downloaded to a general purpose computer which is used to edit the image, if necessary, before cropping the image to the predetermined print area and outputting to the output device (eg. printer device).

The positioning indicator 2401 can advise the user to use another orientation, such as a vertical orientation of the camera 2202, by flashing on and off a peripheral arrow 2402 on the indicator. The position indicator further provides zoom advice to the user. A "zoom in" arrow 2403 indicates that it is desirable to zoom in on the subject 2201 of the image. Accordingly, a "zoom out" arrow 2406 can flash to indicate that it is desirable to zoom out. Alternately, the subject 2201 or the camera 2202 can be moved closer together or farther apart to achieve a substantially similar effect as a zoom in or zoom out respectively.

The centre marker 2405 and the line up marker 2404 are provided for a variation on the first enhanced gathering apparatus in which the enhanced capture device 2100 is capable of analysing the content information of the image and substantially detecting an approximate position of the subject 2201 in the image.

The detection of the approximate position of the subject of the image need not be performed by analysing the content information and can be determined by other techniques. For example, the position of the subject in the image can be determined by detecting which portion of the image a user is looking at from a relative position of the user's eye pupils in relation to the image being observed.

In this variation of the first enhanced gathering apparatus, the centre marker 2405 is placed at the centre of the visible area, while the line up marker 2404 is placed at the centre of a detected subject. Since the line up marker attempts to follow the subject 2201, a user can manipulate the line up marker 2404 and centre marker 2405 by moving the camera 2202 to align the markers.

Figure 22:
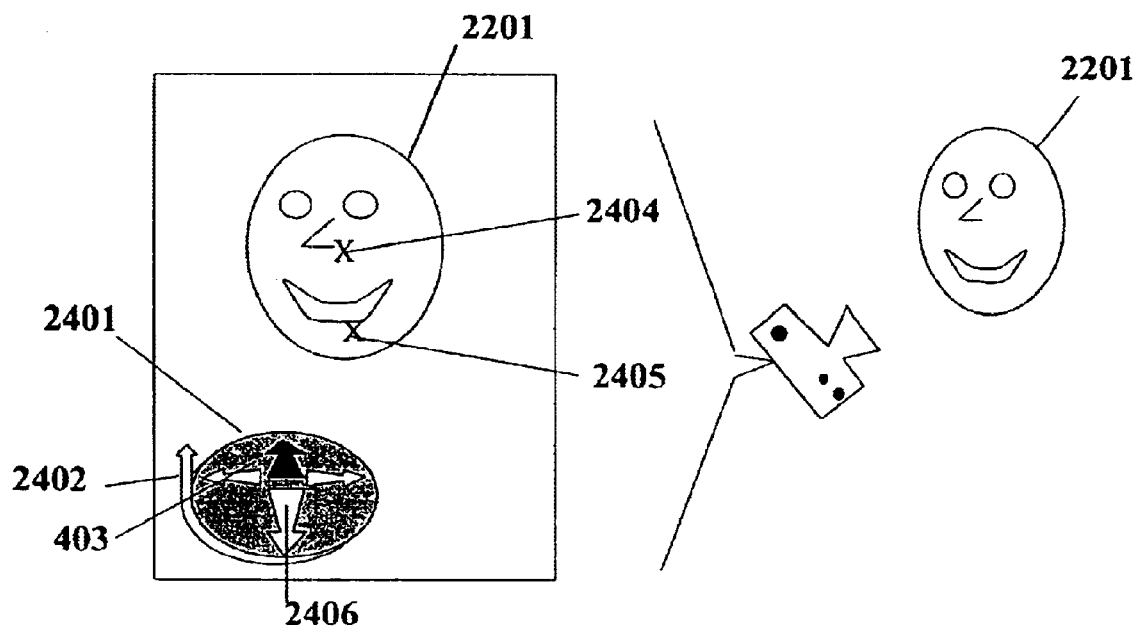
FIG. 22 illustrates another composition feature, "Zoom Guidance", of the Digital Still Camera of FIG. 19.

As illustrated in FIG. 22, the user preferably rotates the camera 2202 into the desired vertical orientation so that the peripheral arrow 2402 no longer flashes on, indicating a correct orientation. At this stage, as illustrated in FIG. 22, the markers 2404, 2405 do not necessarily align, the subject 2201 does not occupy a predetermined portion of the image and the "zoom in" arrow 2403 is still indicating that a zoom in is desired.

Figure 23:
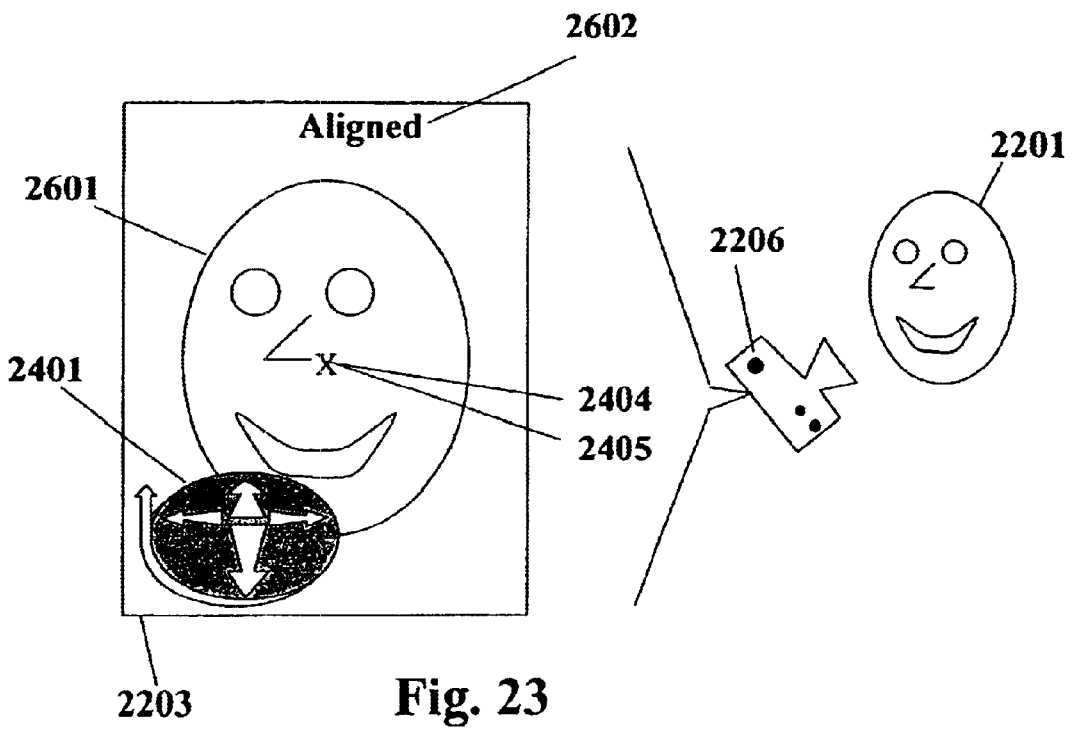
FIG. 23 illustrates an example of an enhanced image composition.

Referring now to FIG. 23, the user has centred and zoomed in on the subject matter 2201 of the image correctly, which results in all the arrows on the position indicator being off and preferably an indicator 2602 of alignment also appears on the LCD 2203. By not indicating any further desired changes to the zoom or orientation, the position indicator is suggestive that the composition of the image (photograph), in accordance with the chosen template, is correct in zoom and orientation and that the current image (photograph) is recommended for recording. The user activates the shutter button 2206 to record the image.

Figure 24:
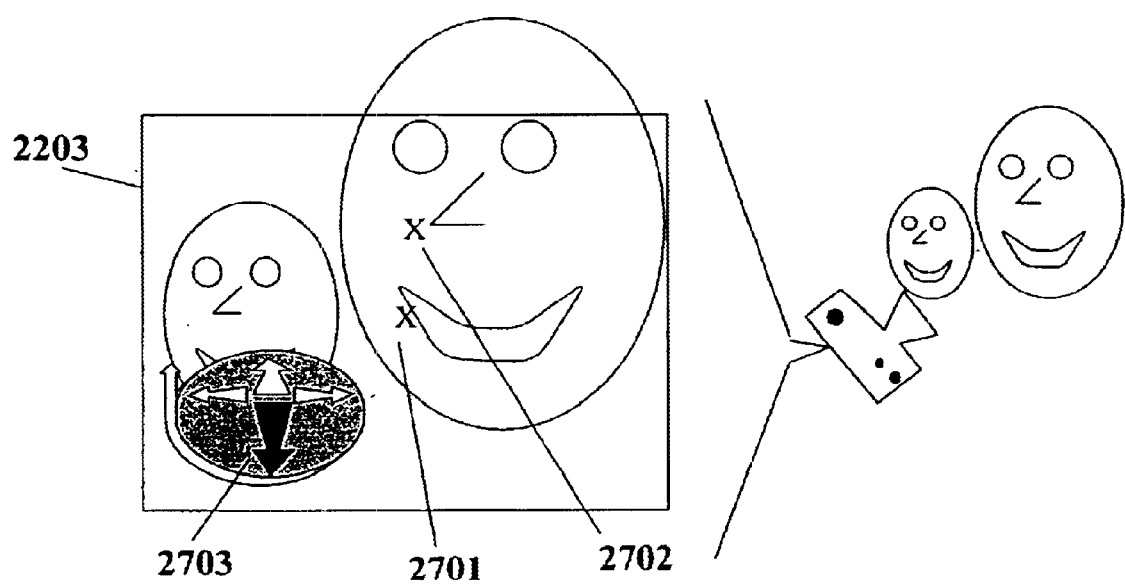
FIG. 24 is an example of a viewfinder display for a portrait of more than one person in the image.

Referring to FIG. 24, there is shown a further example of the Digital Still Camera operating in the portrait template mode where the subject of the image comprises more than one object. The template attempts to optimise a best fit of the objects onto a visual area of the image. Preferably, a geometric centre of a bounding box containing the objects is used as an align marker 2702 location and a geometric centre of the visual area of the image (ie. visible display area 2203) as a centre marker 2701. Further, since one of the objects appears partly outside the visible display area 2203, the position indicator recommends, by flashing on the zoom out arrow 2406, that a zoom out is desirable.

A substantially similar description applies to the landscape template and the pan shot template where the landscape template is generally used for photographing landscape scenery and the pan shot for panoramic wide view shots. For the sake of brevity and clarity, the templates have been described as providing a small number of features such as orientation, zoom, etc. in which the template can provide advice to a user. However, the template is not limited thereto. For example, one or more templates could provide the user with advice on features including desired lighting for a photograph, best angle for lighting in a photographic studio type setting, and camera focus advice to improve composition of a photograph. The camera focus advice can be by way of suggesting a camera setting to achieve a background focus and foreground defocus. The templates attempt to provide advice to the user, from content information available to the templates, which could otherwise be provided by one skilled in the art of photography. For example, advice on preferred orientation, best zoom and positioning of subject matter to provide guidance to the amateur photographer who is typically not abreast of the required skills to produce a quality photograph or a photograph of a predetermined style.

Templates are implemented in code with the use of a programming language as previously described. Pseudocode for a portrait template is included in the accompanying Appendix A. The main routine of the pseudocode executes and runs while the digital still camera is powered up and analyses an image in the viewfinder (LCD 2203) to check for various conditions that are used to detect which of the available template features are optimum.

When the user has pressed the template mode selection button 2204 the available templates are displayed. The user can select a desired template, with the selector button 2205 and then exit the template selection mode. Upon making a selection, a software routine, such as that represented by the pseudocode contained in Appendix A, checks for various conditions that are required for zoom and orientation of the image in the viewfinder.

The sub routine SetUpForTemplate returns a TRUE Boolean value when the image is aligned and the main program "Void Main( )" will flag that the image (picture) is aligned.

As previously described, additional information such as metadata can be recorded and associated with an image. Examples of this additional information include date, time, actual zoom used, shutter speed, aperture, that the still is a portrait of a person, the number of people in the shot and the centre of each face detected in the shot as well as the geometric centre of all the faces detected.

Second Enhanced Gathering Apparatus

As described hereinafter, a second enhanced gathering is substantially the same as the first except that the enhanced capture system 2104 forms part of a video camera. Templates are provided capable of providing advice on features including zoom, pan, composition and directing (in the sense of a film direction) of a video clip. For example, a plurality of uploadable templates can be provided to a user, for uploading into the video camera, including templates for directing a wedding scene; a real estate agent's home selling promotional clip; and a country holiday scene which may include suggestions as to sights and wonders of the world that are recommended for video recording. For instance, the user may be going on a holiday to Egypt and taking a video camera comprising an enhanced capture system 2104. To enhance the composition of a video recording, which will be taken while the user is in Egypt, a template of preferred sights of North Africa can be uploaded to the enhanced capture system 2104. Besides performing the other function herein described, the template may further suggest recommended sights and wonders worth video recording (eg. the Pyramids).

As a further example, reference is made to an uploadable template for directing a wedding scene (hereinafter a wedding template). A user desires to make a video recording of a relative's wedding; the person calls up on a general purpose computer a wedding template and uploads it to the video camera, comprising the enhanced capture system 2104, via the communications port 2106. The wedding template is stored as (compiled) code in the memory storage means 2103 while generic features to uploadable templates have been previously stored in ROM 2108 at, for instance, manufacture of the video camera-enhanced capture device. The generic features may include details of maximum and minimum zoom settings available, aperture settings possible and other features that may be common to a majority of templates for the video camera.

When the user starts to record a wedding scene using the video recorder, the wedding template is activated and advises the user as to the shots the person must take in order to produce a video clip, which upon editing if necessary, complies to a substantially professional video recording, For example, the user is prompted, preferably in chronological order, with shots that provide a desired wedding scene composition. That is, the user is prompted to take a shot of the groom entering the church, the groom standing at the alter, the bride leaving the car and making her way up the steps of the church, the bride walking down the aisle and so on, Further, the user is also advised on technical video issues such as zooming, panning, lighting and audio. For example, if when taking the shot of the bride walking down the aisle, the user zooms too fast on the subject, a "slow down" indicator is flashed in the viewfineder of the video camera and a too slow zoom is equally signalled to speed up the zooming.

Preferably, a user indicates through a series of menu driven commands displayable on a viewfinder (LCD) which section, or portion the user is currently video recording. The user ticks off (selects) the section that is to be, or has just been, video recorded. For example, in the wedding template, the user is given a display of a multitude of sections, or portions, which is recommended for videoing including the aisle section, when the bride is walking down the aisle. The user ticks off the aisle section before or after recording the relevant scene. Data associated with the "ticking off" of a section is recorded as metadata for the corresponding portion of the video clip. For example, information that a portion (section) of the wedding scene is the section where the bride walks down the aisle is recorded as part of the metadata to the wedding scene. At editing of the recorded wedding scene, preferably by an external device such as a computer adapted to edit video clips, the metadata associated with the wedding scene can be used to identify various sections of a wedding scene.

Third Enhanced Gathering Apparatus

A third enhanced gathering apparatus is described with reference to a sound mixing desk comprising enhanced capture device. A sound mixing desk is typically used for gathering musical content from a number of different channels, applying various effects and filters to individual and/or groups of channels, then combining these channels into one or more output channels that are then recorded, or used to drive amplifiers, for an audience.

Again for the sake of simplicity, a simple two-channel interface sound mixing desk is described. The mixing desk is implemented using a computer to display controls, analyse the content, with the aid of filters, analysers, effects units and alike hardware assistance, provide a user feedback and send control signals to the filters and effects units.

Figure 25:
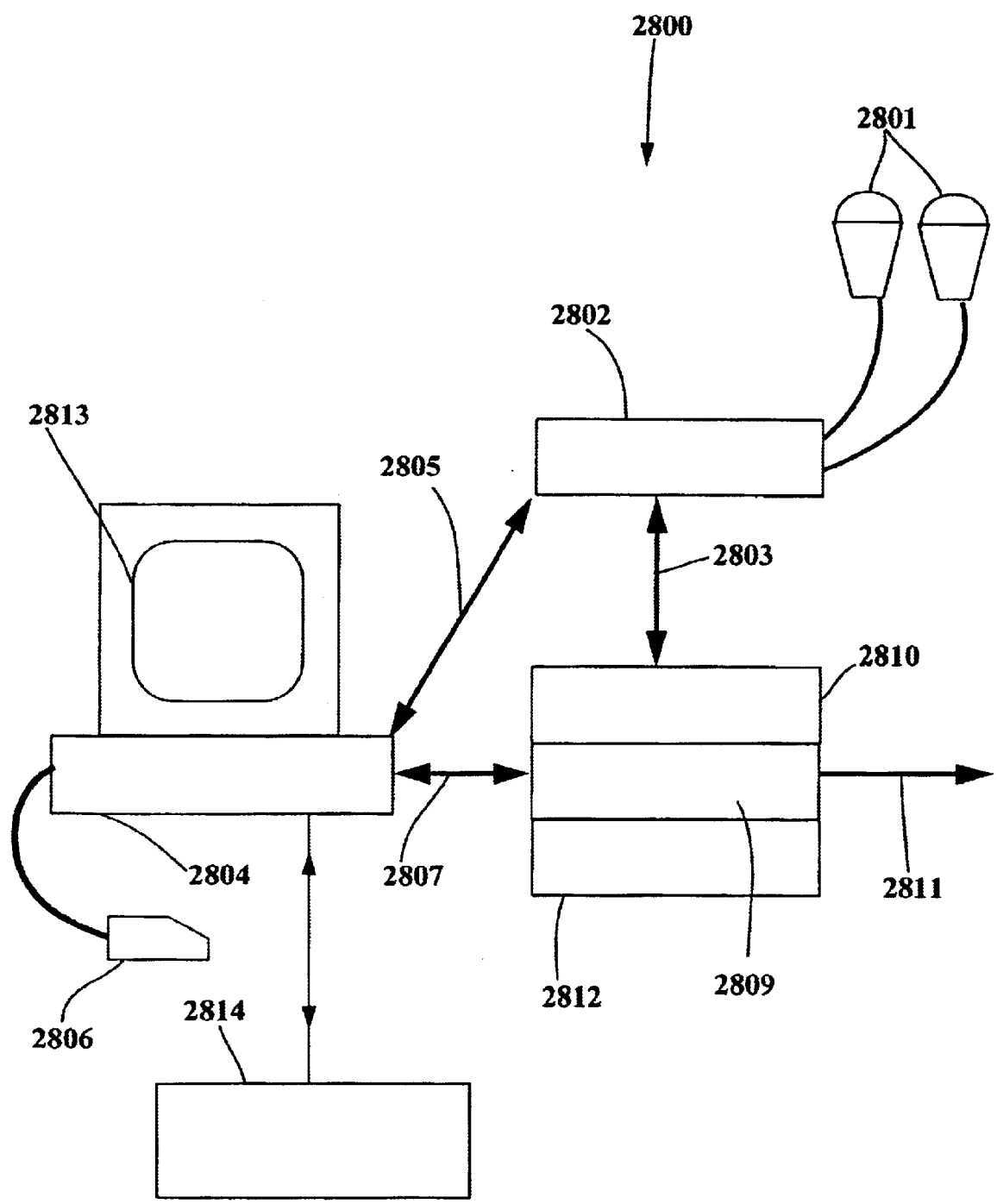
FIG. 25 is a block diagram of an alternate enhanced gathering device.

Referring to FIG. 25, there is shown a sound mixing desk system 2800 comprising: a plurality content gathering sensors 2801 such as sound transducers; an enhanced gathering device 2802 capable of supporting multiple channels; a general-purpose computer system 2804; a plurality of effects units, filter banks and analysers 2810; an output amplifier 2809 with at least one output port 2811; and playback devices 2812 including compact disk CD player, reel to reel tape and/or cassette tape unit.

Information gathered by the sensors 2801, and the other peripheral devices 2812 is passed to the enhanced capture device 2802 which processes the gathered information according to a selected template. A desired collection of templates is uploaded to the enhanced gathering device 2802 by a data (omnibus) link 2805 to be stored in a memory storage unit of the device 2802. While the type of content gathering sensors may vary from implementation to implementation, the enhanced gathering device 2802 comprises substantially the same components as illustrated in FIG. 18. In the present example of a sound mixing desk 2800, a user interface unit of FIG. 18 is excluded, preferably, in favour of an external display 2813, keyboard 2814 and mouse 2806 device.

The information gathered by the sensors 2801 and other peripheral devices 2812 form part of the content information. The content information preferably includes metadata such as time, date, recording duration length, musical style and title of track, which may be added to the content information by a selected template. Although a plurality of templates are uploaded to the enhanced gathering device 2802, a single template selection can be made by a user through manipulation of a mouse and/or keyboard device driven menu displayed on the display device 2813. The information gathered is directed, via a communication link 2803 between the enhanced gathering device 2802 and the plurality of effect units, filter banks and analysers 2810, to the output amplifier 2809 and output port 2811 for use. Content information is passed to the computer 2804 through the omnibus link 2805, and data about content information is displayed for the user on the display device 2813. Preferably, the content information is further analysed by a central processing unit which extracts data to be displayed. Alternatively, the content information is analysed by the enhanced gathering device and only relevant display data is transmitted via link 2805 to the computer 2804.

The user is allowed to interact with various settings through manipulation of the input devices 2806 and 2814. The various settings are conveyed on a bidirectional link 2807, as control signals, to the amplifier 2809 and to the plurality of effect units, filter banks and analysers 2810 that are designed to alter parameters of effects, filters to produce desired modifications to the information output on 2811. The bidirectional link 2807 preferably also carries signals generated by a number of devices, including the plurality of effects units, filter banks, analysers 2810, the output amplifier 2809 and the playback devices 2812, relating to a current status and/or playback content information of the various playback devices 2812 if required.

A user can alter preference and default settings through the computer system 2804. The default settings are generally dictated by the type and/or combination of components connected at a sound mixing desk. For instance, different choices of transducers or playback devices may require different default settings. Preference settings generally provide a manner of customising a sound mixing system to user preferred settings, Both preference and default settings are stored in non-volatile memory, generally part of the computer system 2804.

An example of an uploadable template is described below with reference to a band mix template. A band mix template provides advice to a user, of the sound mixing system, associated with sound mixing (and if desired recording) of musical bands, including such band styles as a String Quartet, a Rock and Roll band, a Heavy Metal band and a Classical Orchestra. At selection (and execution) of the band mix template, the user is prompted to tick off (select) a music style of the band, a size of the venue (ie small hall, outdoors, studio etc). Preferably, the user is further prompted to identify which channels (or associated sensors) are to used to gather information (sound signals) for instruments and which sensors are for vocals. The band mix template then produces a recommended list that provides best allocation of available microphones (sensors) for each channel.

Further, the user may select a test run ("dry run"), upon which the band mix template can analyse the content information and advise on which sensor is picking up reflections off surrounding objects, and either nominate a solution (eg. re-allocate the microphones or re-position the sensors) or attempt to electronically compensate for the distortion through the effects and filters available. Similarly, if the band does a dry run of a performance in the correct order, a sound level setting can be determined and used as a guide for an eventual performance.

As data (information) is collected by the sensors 2801, the enhanced gathering device 2802 performs content information extraction and provides this content information to the computer 2804 Preferably, from the derived content information, the computer 2804 sends compensation control signals, for the sensors on each channel, to adjust the filters (graphics equalisation), on each channel. The computer 2804 further sends control signals that adjust the effects and also fine tune the filters on each channel to all the instruments in a band, to conform with the music style of the template.

For example, a user can select a Heavy Metal music template with a high distortion level to the vocal channel. Boosting of the top end frequencies is recommended to the user of the mixing desk and preferably these features are adopted automatically unless the user desires otherwise.

However, if the user selects a Classical music template, then all the channels are biased to a sound level setting to be as flat as possible. That is, no (special) effects, through the effect units and/or filter banks, are added to the channels so that instrument sounds are reproduced as closely as possible to a true sound of the instrument.

As previously described the template provides advice to the user which could otherwise be provide by one skilled in the art. In the present example the art is the art of sound mixing, for example advice on echo, sound reflection, reverberation, tempo are at least some features that a sound engineer would advise on when recording and sound mixing.

Whilst only briefly described with reference to the second enhanced gathering apparatus, an optional preferred feature of the templates applicable to each of the above described apparatus is that of providing a check list of events or actions that a user can tick off (select) in respect of predetermined events or actions. For instance, in the digital still camera example described above, a check list of predetermined shots is provided to a user through the user interface. Before (or after) the user takes a shot (photograph), the user ticks off a corresponding predetermined shot from the check list. For example, the digital still camera is uploaded with a birthday party template which includes a birthday party check list. The check list is displayed on the user interface and the check list may include, by way of example, the following:

birthday party games shot;
blowing out of the candles shot; and
making a toast to the birthday person shot.

The user takes photographs of the birthday party and if the photograph taken coincides with a shot described on the check list—the user can tick off (mark or select) that a predetermined photograph described in the check list has been taken. Accordingly, at ticking off a selected shot from the check list, metadata is generated and associated with the photograph (or image). This metadata information can be utilised, for example, when the photograph (or image) is downloaded to a general purpose computer, to put together a photo-album of the birthday party.

A plurality of check lists can be provided with each template that can assist the user in determining which photographic shots would make good composition when putting a photographic album together.

In the example of the sound mixing desk, a substantially similar check list for music can be provided where a user ticks off the check list once an event (eg. musical piece, mixing characteristics) described in the list is performed. Again, corresponding metadata is generated and associated with the event. The corresponding metadata can be a simple identifier for the event or a more complex description of the event as may be desired for future manipulation or editing of the event.

Figure 26:
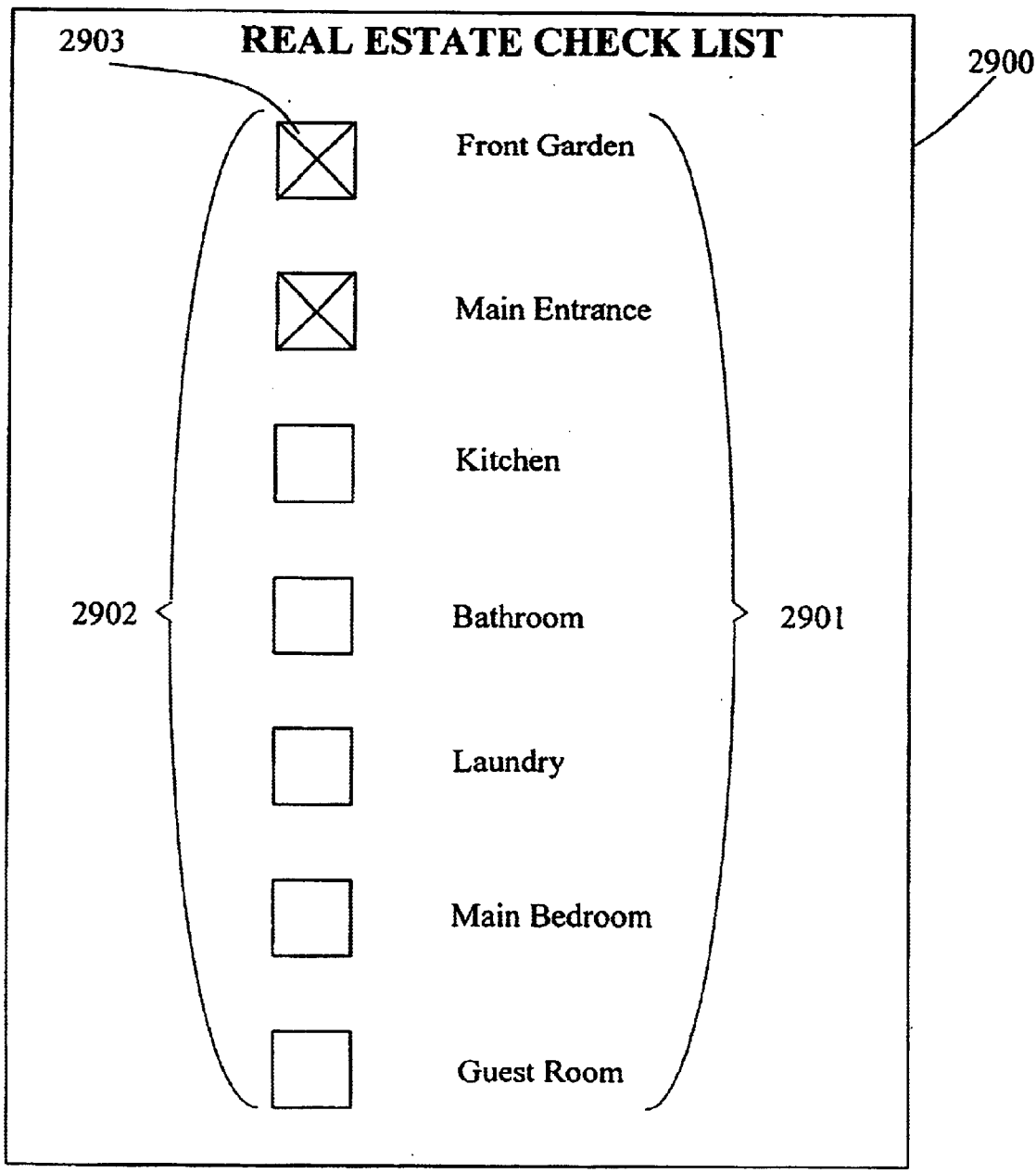
FIG. 26 is an example of a check list associated with a template.

Referring now to FIG. 26, there is shown another example of a check list displayed on the user interface display (eg. viewfinder 2203 of the digital still camera of FIG. 19 or the viewfinder of the video camera of the second enhanced gathering apparatus hereinbefore described). The check list 2900 is associated with a real estate template which can be uploaded (load) into the enhanced gather capture device 2100 as previously described with reference to the first and/or second enhanced gathering apparatus. The real estate template advises a user (typically a real estate salesperson), of the digital still camera or the video camera on composition and/or images required to compose a good presentation The real estate template can, as an optional function, provide a real estate check list 2900 comprising: description fields 2901 which provide a brief description of a recommended photograph (or video clip in the case of the video camera) to be recorded; check list indicator fields 2902 provided for marking off each corresponding image (photograph) recorded; and check list marker 2903 to indicate which of the recommended images have been recorded.

The check list marker 2903 is typically added by the user, through an available user input interface (eg. buttons), preferably when the recommended image has been recorded. The real estate template, upon checking off the items of the check list, generates metadata and associates the metadata with the corresponding image of the check list. Preferably, the metadata is an encoded description of the corresponding image to which it is associated. Further, the metadata can include such characteristics as time, date, location etc.

Figure 27:
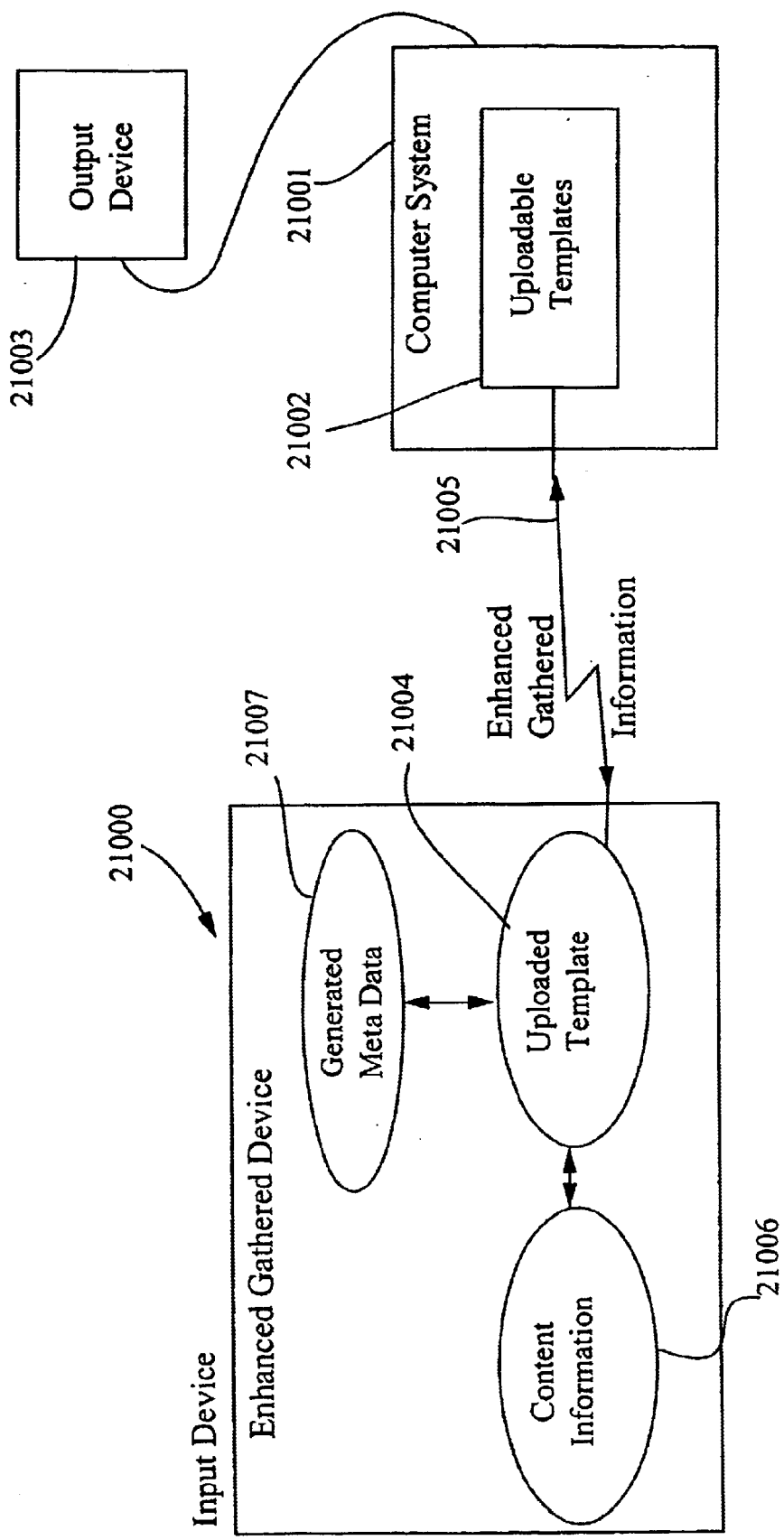
FIG. 27 is a block diagram of information flow for the enhanced gathering devices.

Referring to FIG. 27, there is illustrated a block diagram of information flow from an enhanced capture (gather) device 21000 to a computer system 21001 comprising uploadable templates 21002 and subsequently to an output device 21003. A plurality of templates 21002 are uploaded, via a bidirectional communication link 21005, typically from a computer system 21001 comprising a set of templates 21002.

Content information 21006 is gathered by the input devices 21000, and metadata 21007 is generated by at least one of the uploaded templates 21004. The generated metadata 21007 can be as simple as a description of the content information determined by a user response to a check list and/or determined from the template by analysis of the content information 21006. The generated metadata 21007 is associated by the template to a corresponding part or all of the content information 21006. For example, in the case of the real estate template—the content information may comprise an image from a recommended check list 2900 of images suggested by the real estate template. The corresponding metadata generated for the image can be based upon features including: content analysis directed to orientation, average colour, average brightness, dominant colours, predetermined patterns, statistical analysis in spatial, time or frequency domains identified in the content information; user preferences including colour, arrangement of information; and device specific features including a current state of hardware components, predetermined formatting of information for downloading to various output devices.

The enhanced gathered information, which includes content information and metadata is downloaded to an external device. In the present example, the external device is a general purpose computer system 21001 as previously described.

However, the external device can be a dedicated external device capable of receiving the enhanced gathered information. Such dedicated devices include: a printer device, a display device (eg. cathode ray tube, CTR, Liquid Crystal Display (LCD)), a photocopying device, and/or an acoustic recording device, each of which have been adapted to receive the gathered information and provide an output or storage of the information according to predetermined preferences. The external device can be, for example, a video cassette tape for recording and storage of the enhanced gathered information to be used at a latter stage in composing a final output.

Preferably, an uploaded template 21004 formats and arranges the enhanced gathered information in accordance with predetermined setting or formats the enhanced gathered information depending upon the type of external device to which the enhanced gathered information is to be downloaded to.

The process of enhancing gathered information may be practiced as software, readable and executable by a processing device such as a microprocessor, recorded on a computer readable recording medium. The recording medium includes magnetic and optical storage memory such as a hard and/or floppy drive, magnetic tape, CD-ROM, magneto-optical disk, a memory card, read-only memory, etc. Further the software may be resident on another computer system accessed through a Network system or across the Internet, Examples of enhanced gathering devices that may be used in implementations of the present invention include the following digital video camcorder devices:

SONY VX-1000 (Sony Corporation, Japan);
SONY PC-10 (Sony Corporation, Japan);
PANASONIC NV-DS5 (Matsushita Electric Corp, Japan);
CANON MV1 (Canon Inc., Japan); and
CANON XL1 (Canon Inc, Japan).

These devices provide for the generation of a limited set of metadata relating to recorded audiovisual information. Such metadata typically relates to rudimentary identification of the information. More advance devices include the:

KODAK DC220, 260 (Kodak Corp., USA); and
MINOLTA Dimage EX Zoom 1500 (Minolta Corp., Japan), both of which are still image digital cameras and may generate higher level metadata, for example corresponding to the "real estate" embodiment described with reference to FIG. 26.

The foregoing describes only some embodiments of the present invention, however, modifications and/or changes can be made thereto without departing from the scope and spirit of the invention.

```
Pseudo Code
// Portrait Template
Boolean SetUpForPortrait(Boolean UI_Flags[ ], image)
{
    Boolean Result = TRUE
    // Assume only called IF 0 < numFacesDetected < 4
    IF IndequateMarginAroundGeometricCentre(image) THEN
        UI_Flags[ZOOM_OUT] = TRUE
        Result = FALSE
    ELSEIF ToMuchMarginAroundGeometricCentre(image) THEN
        UI_Flags[ZOOM_IN] = TRUE
        Result = FALSE
    ENDIF
    IF ((FacesBoundingBoxTallerThanItIsWIde(image) AND
        CameraOrientation Equals LANDSCAPE) OR
        (FacesBoundingBoxWidererThanItIsTall(Image) AND
        CameraOrientation Equals PORTRAIT)) Then
        UI_Flags[CHANGE_ORIENTATION] = TRUE
        Result = FALSE
    ENDIF
    IF (FacesBoundingBoxCentred(image) EQUALS FALSE THEN
        UI_FLAGS[CENTRE_BOUNDINGBOX] = TRUE
        Result = FALSE
    ENDIF
    RETURN Result
}
Void main()
Boolean UIFlags(CONS_NUM_UI_FLAGS)
ImageType image
TemplateType templateSelected
WHILE PoweredOn
IF MenuButtonPressed() Then
        templateSelected = DisplayAvailableTemplates()
    ENDIF
    // Get the image that the camera is looking at
    GetImageInViewfinder(image)
    // Check for cases for which there is a template
    IF templateSelected EQUALS CONST_PORTRAT_TEMPLATE
    THEN
        IF SetUpForPortrait(UIFlags, image) EQUALS TRUE THEN
                        UIFlags[PICTURE_ALIGNED] = TRUE
        ENDIF
    ELSEIF......
        ..... Other checks for other templates
    ENDIF
    UpdateUI(UIFlags)
END WHILE
}
```

What is claimed is:

1. A computerised method of forming a dynamic media production from source media having elements including at least one of audio media and visual media, said method including the steps of:

(a) receiving said source media;

(b) analysing at least one said element for at least a portion of said source media with a predetermined set of content rules to extract therefrom content information associated with a corresponding portion of said source media;

(c) examining the content information of at least one said portion to determine a limited set of production rules applicable to the corresponding said element;

(d) selectively applying at least one of said production rules to a corresponding one of said elements so as to alter said corresponding one element; and (e) combining at least said altered element with other of said media to form said media production wherein said content information of said visual element includes metadata encoded with said visual element with a creation of said visual element.

2. A method according to claim 1 wherein said content information include zoom data regarding a visual image present in said visual element.

3. A computerised method of forming a dynamic media production from source media having elements including at least one of audio media and visual media, said method including the steps of:

(a) receiving said source media;

(b) analysing at least one said element for at least a portion of said source media with a predetermined set of content rules to extract therefrom content information associated with a corresponding portion of said source media;

(c) examining the content information of at least one said portion to determine a limited set of production rules applicable to the corresponding said element;

(d) selectively applying at least one of said production rules to a corresponding one of said elements so as to alter said corresponding one element; and (e) combining at least said altered element with other of said media to form said media production, said method further comprising the step of printing an image representative of said visual element based upon characteristics of said visual element included in said content information, said printed image forming an identifier to said user as a significant portion of said visual element.

4. A media production system comprising:

a media input arrangement for receiving source media including at least one of audio media and visual media;

analysing means for analysing said source media to extract therefrom content information associated with a corresponding element of said source media;

examining means for examining the content information of at least one said element to determine a limited set of production rules applicable to the corresponding said element;

command means for presenting to a user of said system at least said set of production rules and corresponding representation of said element and for receiving user input commands of selected ones of said rules to be applied to corresponding said elements;

modifying means for applying said selected rules to a corresponding one of said elements so as to alter said corresponding one element; and combining means for combining at least said altered element with other of said media to form said media production wherein said content information of said visual element includes metadata encoded with said visual element with a creation of said visual element.

5. A system according to claim 4 wherein said content information include zoom data regarding a visual image present in said visual element.

6. A media production system comprising:

a media input arrangement for receiving source media including at least one of audio media and visual media;

analysing means for analysing said source media to extract therefrom content information associated with a corresponding element of said source media;

examining means for examining the content information of at least one said element to determine a limited set of production rules applicable to the corresponding said element;

command means for presenting to a user of said system at least said set of production rules and corresponding representation of said element and for receiving user input commands of selected ones of said rules to be applied to corresponding said elements;

modifying means for applying said selected rules to a corresponding one of said elements so as to alter said corresponding one element; and combining means for combining at least said altered element with other of said media to form said media production further comprising means for printing an image representative of said visual element based upon characteristics of said visual element included in said content information, said printed image forming an identifier to said user as a significant portion of said visual element.

7. A computerised method according to claim 1 wherein said content information includes, in relation to said at least one element, at least one of a corresponding:

date;
time;
location;
user annotation;
ambient sound level;
ambient light level; and
capture device parameter setting.

8. A media production system according to claim 4 wherein said content information includes, in relation to said at least one element, at least one of a corresponding:

date;
time;
location;
user annotation;
ambient sound level
ambient light level; and
capture device parameter setting.

* * * * *

UNITED STATES PATENT AND TRADEMARK OFFICE
CERTIFICATE OF CORRECTION

PATENT NO.    : 6,686,970 B1
DATED         : February 3, 2004
INVENTOR(S)   : John Richard Windle It is certified that error appears in the above-identified patent and that said Letters Patent is hereby corrected as shown below:

Drawings,
Sheet 25, FIG. 28, "contenent" should read -- content --.

Column 2,
Line 46, "chart" should read -- chart of --.

Column 4,
Line 4, "and" should read -- an --.

Column 6,
Line 29, "a true" should read -- a "true" --.

Column 7,
Line 55, "(ie." should read -- (i.e. -- ; and close up right margin.; and
Line 56, "Dissolve," should read -- dissolve, -- and close up left margin.

Column 8,
Line 26, "process" should read -- processes --;
Line 40, "is" ($3^{rd}$ occurrence) should be deleted; and
Line 54, "the" should read -- The --.

Column 9,
Line 10, "a" should be deleted; and
Line 40, "tract" should read -- track --.

Column 10,
Line 15, "occur" should read -- occurs --.

Column 11,
Line 16, "common" should read -- a common --.

Column 13,
Line 20, "these" should read -- this --;
Line 36, "latter" should read -- later --; and
Line 53, "alike" should read -- like --.

Column 15,
Line 18, "EBM-PC'S" should read -- IBM-PC's --; and
Line 37, "content,recording" should read -- content recording --.

UNITED STATES PATENT AND TRADEMARK OFFICE
CERTIFICATE OF CORRECTION

PATENT NO. : 6,686,970 B1
DATED : February 3, 2004
INVENTOR(S) : John Richard Windle It is certified that error appears in the above-identified patent and that said Letters Patent is hereby corrected as shown below:

Column 20,
Line 24, "on," should read -- on. --.

Column 24,
Line 41, "loaded to." should read -- loaded. --.

Column 25,
Line 7, "invention." should read -- invention.
                    APPENDIX   A --.

Column 26,
Lines 7 and 55, "include" should read -- includes --.

Signed and Sealed this

Twentieth Day of July, 2004

JON W. DUDAS
*Acting Director of the United States Patent and Trademark Office*